United States Patent
Ogasahara et al.

(10) Patent No.: US 9,461,841 B2
(45) Date of Patent: Oct. 4, 2016

(54) COMMUNICATION SYSTEM, COMMUNICATION METHOD, NODE, AND PROGRAM FOR NODE

(75) Inventors: Daisaku Ogasahara, Tokyo (JP); Masahiro Sakauchi, Tokyo (JP)

(73) Assignee: NEC CORPORATION, Tokyo (JP)

( * ) Notice: Subject to any disclaimer, the term of this patent is extended or adjusted under 35 U.S.C. 154(b) by 1313 days.

(21) Appl. No.: 12/160,055

(22) PCT Filed: Jan. 5, 2007

(86) PCT No.: PCT/JP2007/050034
§ 371 (c)(1),
(2), (4) Date: Jul. 3, 2008

(87) PCT Pub. No.: WO2007/077998
PCT Pub. Date: Jul. 12, 2007

(65) Prior Publication Data
US 2009/0268746 A1  Oct. 29, 2009

(30) Foreign Application Priority Data
Jan. 6, 2006 (JP) .................. 2006-001768

(51) Int. Cl.
*H04L 12/46* (2006.01)
*H04L 12/413* (2006.01)
*H04L 12/42* (2006.01)
(Continued)

(52) U.S. Cl.
CPC ......... *H04L 12/4637* (2013.01); *H04L 12/413* (2013.01); *H04L 12/42* (2013.01); *H04L 29/12584* (2013.01); *H04L 29/12839* (2013.01); *H04L 61/2596* (2013.01); *H04L 61/6022* (2013.01); *H04L 41/12* (2013.01)

(58) Field of Classification Search
None
See application file for complete search history.

(56) References Cited

U.S. PATENT DOCUMENTS

| 5,859,836 A * | 1/1999 | Eslambolchi ......... H04L 12/437 370/222 |
| 2003/0118041 A1* | 6/2003 | Fontana .............. H04L 12/4637 370/404 |
| 2003/0154315 A1* | 8/2003 | Sultan ................... H04L 12/437 709/251 |

(Continued)

FOREIGN PATENT DOCUMENTS

| JP | 01161947 A | 6/1989 |
| JP | 2000-004248 | 1/2000 |

(Continued)

OTHER PUBLICATIONS

English-language abstract only of Japanese Patent Application Publication No. 09-153916 dated Jun. 10, 1997.

(Continued)

*Primary Examiner* — Chirag Shah
*Assistant Examiner* — Amar Persaud
(74) *Attorney, Agent, or Firm* — Scully, Scott, Murphy & Presser, P.C.

(57) ABSTRACT

In the case where a terminal under an RPR node (240) which does not belong to an interlink connection node group in an RPR network (20) transmits an Ethernet frame to a terminal under an RPR node of other RPR network (10), the RPR node (240) transmits an RPR frame in which the Ethernet frame is contained to any of interlink connection nodes (200, 230, and 270) in the same network. The interlink connection node which receives the RPR frame extracts the Ethernet frame from the RPR frame and transfers the extracted Ethernet frame to the other RPR network (10).

24 Claims, 20 Drawing Sheets

(51) Int. Cl.
*H04L 29/12* (2006.01)
*H04L 12/24* (2006.01)

(56) References Cited

U.S. PATENT DOCUMENTS

| | | | | |
|---|---|---|---|---|
| 2003/0208525 | A1* | 11/2003 | Bannai | H04L 12/1836 709/201 |
| 2004/0170184 | A1* | 9/2004 | Hashimoto | H04L 12/42 370/401 |
| 2006/0092856 | A1* | 5/2006 | Mitsumori | H04L 1/22 370/254 |
| 2006/0106968 | A1* | 5/2006 | Wooi Teoh | H04L 12/40 710/316 |
| 2006/0109802 | A1* | 5/2006 | Zelig | H04L 12/42 370/258 |
| 2006/0209859 | A1* | 9/2006 | Mutoh | H04L 12/462 370/404 |

FOREIGN PATENT DOCUMENTS

| | | |
|---|---|---|
| JP | 2001211204 A | 8/2001 |
| JP | 2003023444 A | 1/2003 |
| JP | 2003-258822 | 9/2003 |
| JP | 2004179880 A | 6/2004 |
| JP | 3599476 | 9/2004 |
| JP | 2005-159546 | 6/2005 |
| WO | WO 2005/027427 A1 | 3/2005 |

OTHER PUBLICATIONS

IEEE Standards for Information technology—Telecommunications and information exchange between systems—Local and metropolitan area networks—Specific requirements, 802.17 "Part 17: Resilient packet ring (RPR) access method and physical layer specifications", IEEE Computer Society, 2004, p. 27-54.

IEEE Std 802.3ad-2000, Information technology—Telecommunications and information exchange between systems—Local and metropolitan area networks—Specific requirements, "Amendment to Carrier Sense Multiple Access with Collision Detection (CSMA/CD) Access Method and Physcial Layer Specifications", Aggregation of Multiple i ink Segments, 2000, p. 95-107.

Sakauchi, M, et al., "B-7-97 Multi Ring RPR ni Okeru Interlink Jocho Hoshiki", 2005 Nen the Institute of Electronics, Information and Communication Engineers Sogo Taikai Koen Ronbunshu Communication 2, Mar. 7, 2005, p. 251.

Japanese Official Action dated Mar. 1, 2013 received from related application JP 2011-177590.

* cited by examiner (T: TERMINAL)

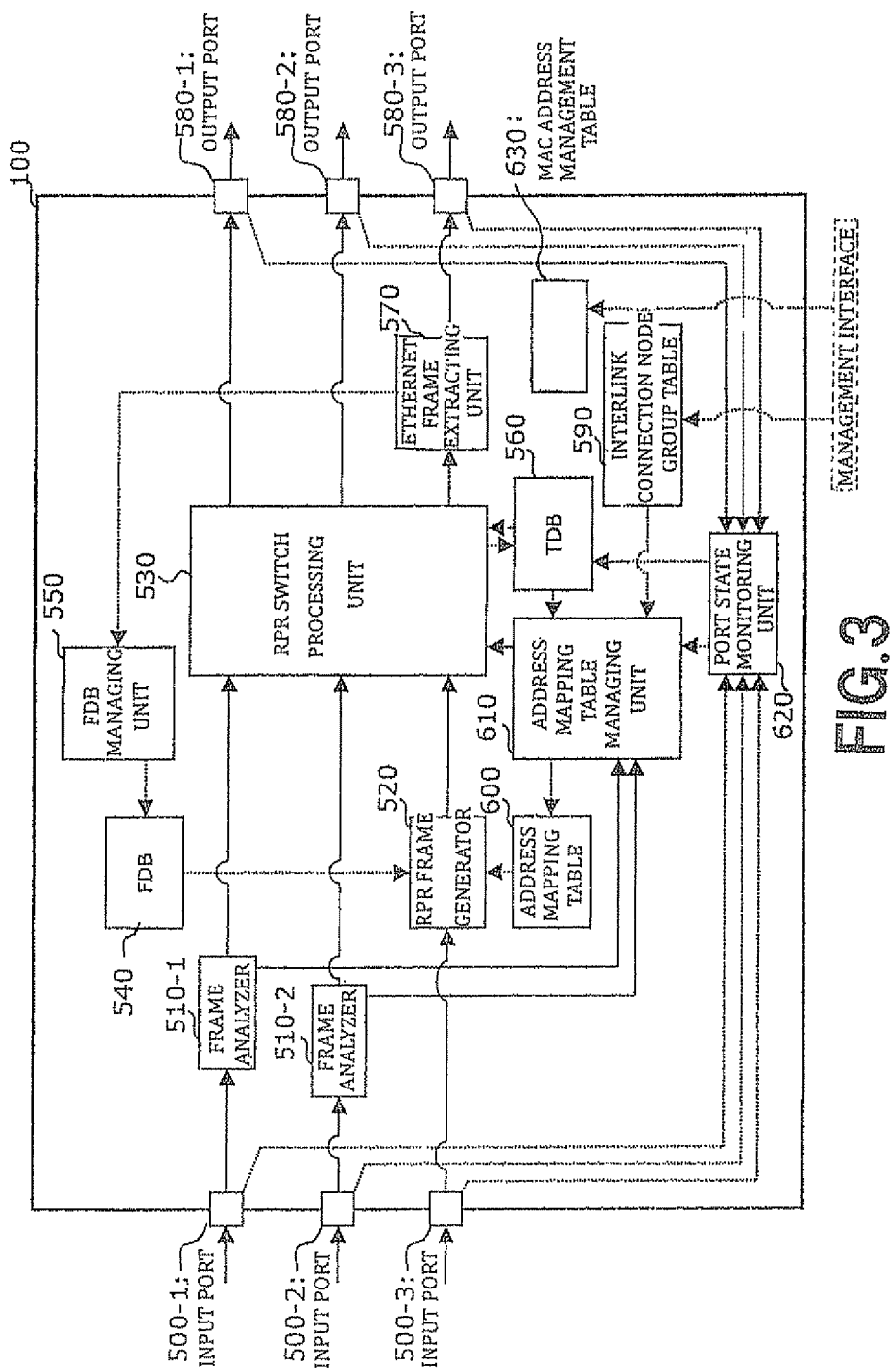

FIG. 4

FDB IN RPR NODE 100

| MAC ADDRESS OF DESTINATION | MAC ADDRESS OF RPR NODE OR VIRTUAL MAC ADDRESS OF INTERLINK CONNECTION NODE GROUP |
|---|---|
| MAC ADDRESS OF TERMINAL UNDER RPR NODE 120 | MAC ADDRESS OF RPR NODE 120 |
| MAC ADDRESS OF TERMINAL UNDER RPR NODE 130 | MAC ADDRESS OF RPR NODE 130 |
| MAC ADDRESS OF TERMINAL UNDER RPR NODE 140 | MAC ADDRESS OF RPR NODE 140 |
| MAC ADDRESS OF TERMINAL UNDER RPR NODE 150 | MAC ADDRESS OF RPR NODE 150 |

FIG. 5

TDB IN RPR NODE 100

| NODE IDENTIFIER OF RPR NODE | PORT STATE OF PORT P1 | PORT STATE OF PORT P2 |
|---|---|---|
| MAC ADDRESS OF RPR NODE 100 | VALID | VALID |
| MAC ADDRESS OF RPR NODE 110 | VALID | VALID |
| MAC ADDRESS OF RPR NODE 120 | VALID | VALID |
| MAC ADDRESS OF RPR NODE 130 | VALID | VALID |
| MAC ADDRESS OF RPR NODE 140 | VALID | INVALID |
| MAC ADDRESS OF RPR NODE 150 | INVALID | VALID |
| MAC ADDRESS OF RPR NODE 160 | VALID | VALID |
| MAC ADDRESS OF RPR NODE 170 | VALID | VALID |

FIG. 6

INTERLINK CONNECTION NODE GROUP TABLE

| NAME OF INTERLINK CONNECTION NODE GROUP | GROUP IDENTIFIER OF INTERLINK CONNECTION NODE GROUP | NODE IDENTIFIERS OF INTERLINK CONNECTION NODES BELONGING TO INTERLINK CONNECTION NODE GROUP |
|---|---|---|
| A | VIRTUAL MAC ADDRESS "a" | MAC ADDRESS OF RPR NODE 100, MAC ADDRESS OF RPR NODE 110, AND MAC ADDRESS OF RPR NODE 160 |

FIG. 7

ADDRESS MAPPING TABLE OF RPR NODE 100

| VIRTUAL MAC ADDRESS OF INTERLINK CONNECTION NODE GROUP | MAC ADDRESS OF INTERLINK CONNECTION NODES BELONGING TO INTERLINK CONNECTION NODE GROUP |
|---|---|
| VIRTUAL MAC ADDRESS "a" | MAC ADDRESS OF RPR NODE 100, MAC ADDRESS OF RPR NODE 110, AND MAC ADDRESS OF RPR NODE 160 |

FIG. 8

MAC ADDRESS MANAGEMENT TABLE OF RPR NODE 100

| MAC ADDRESS OF RPR NODE 100 |
|---|

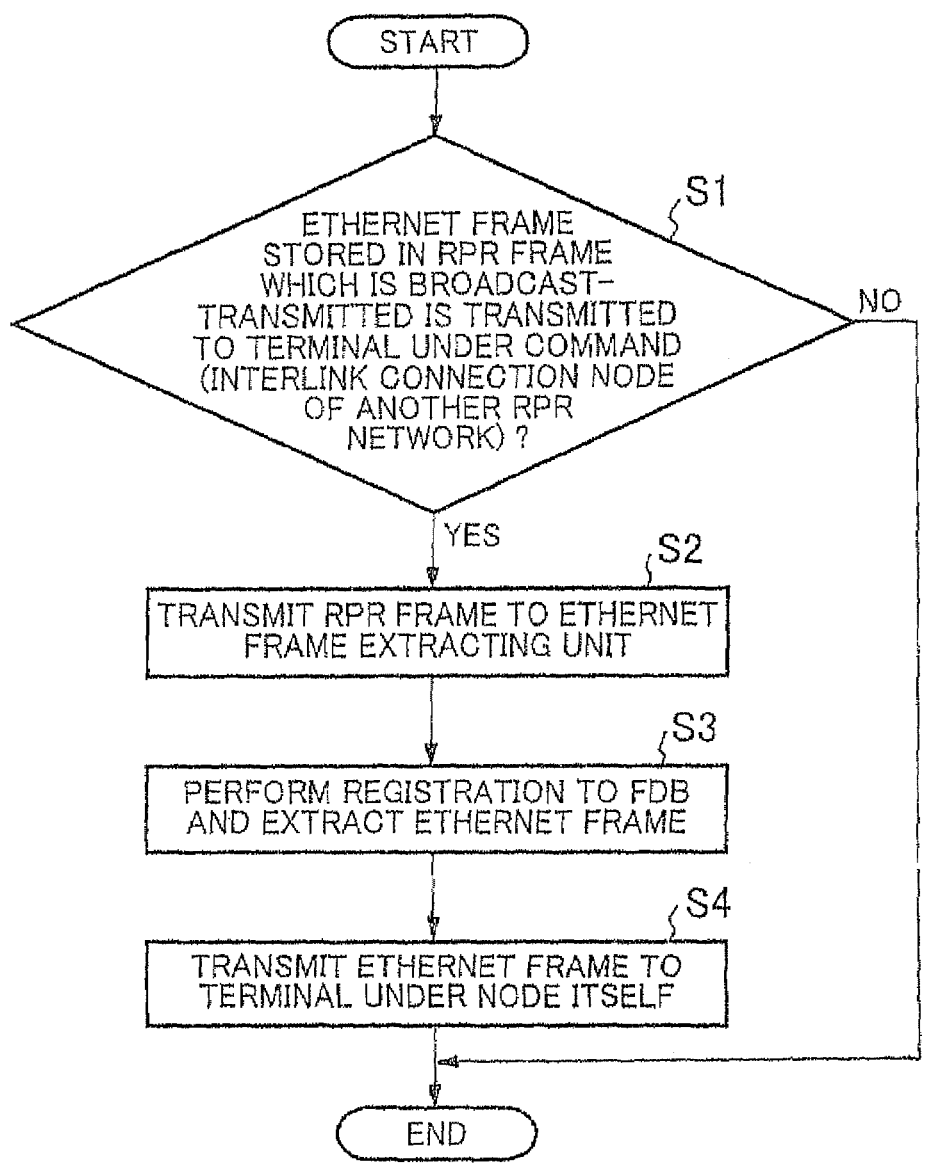

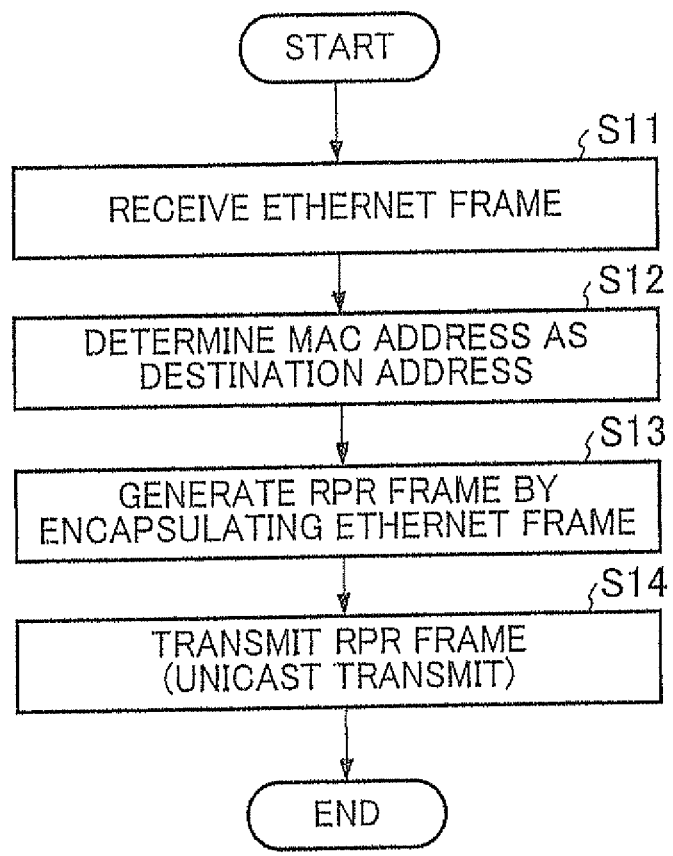

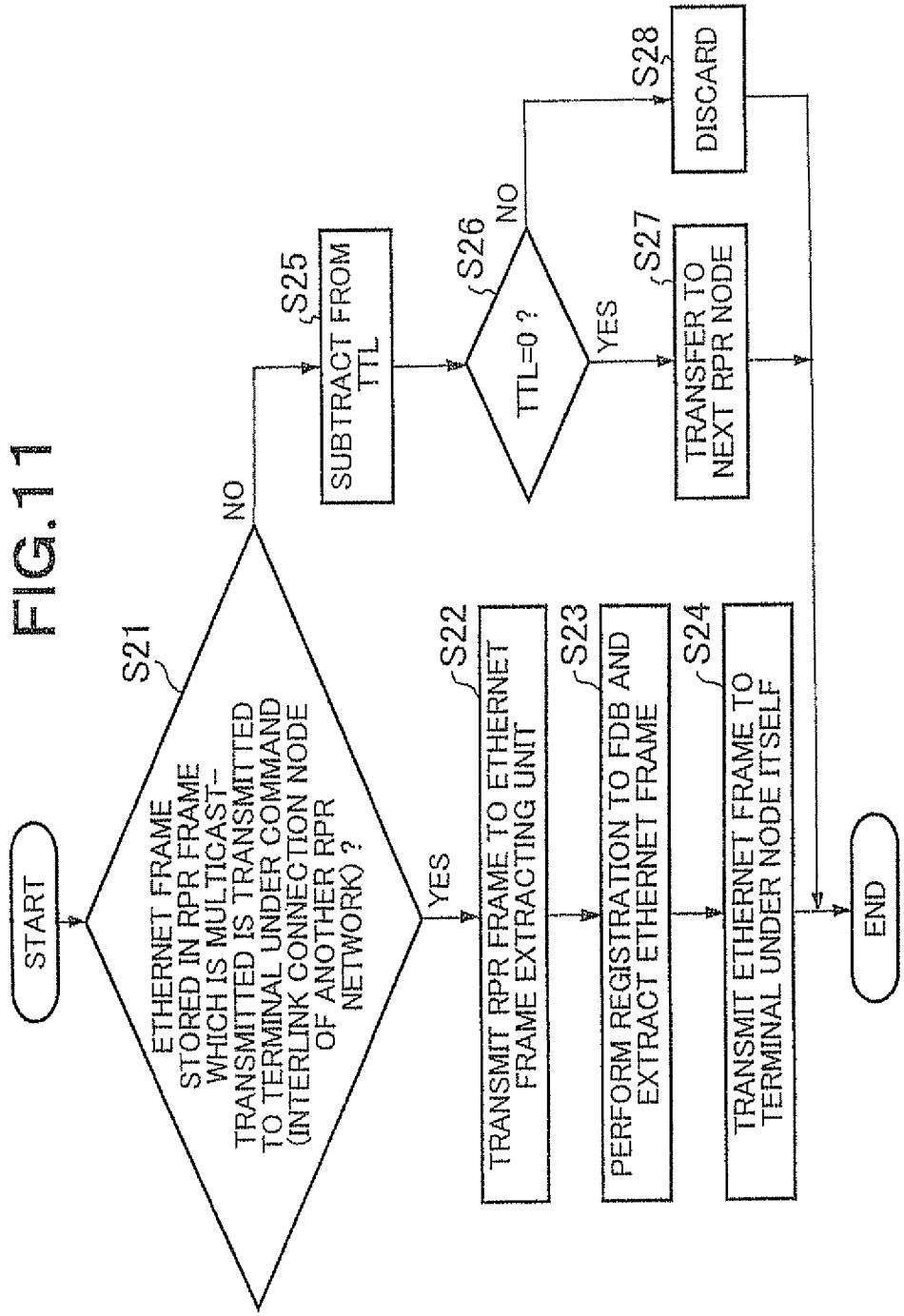

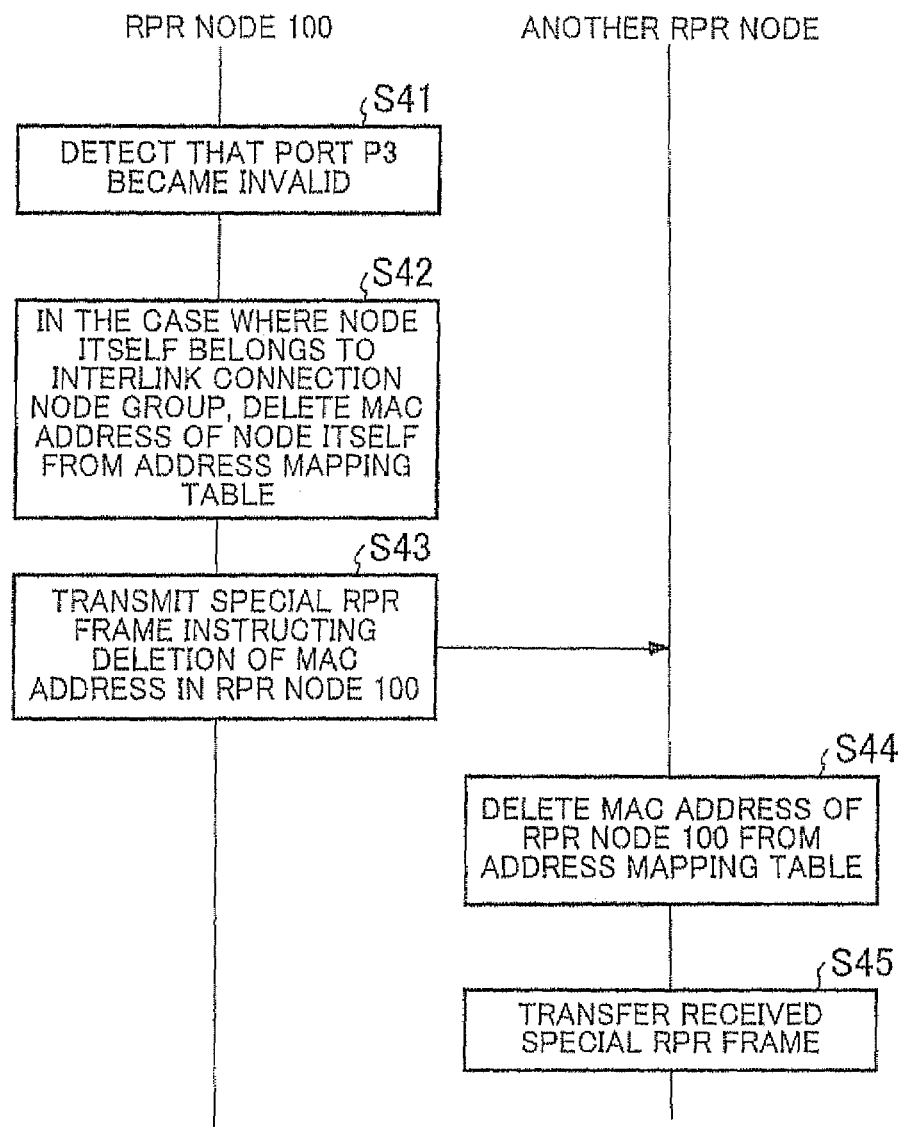

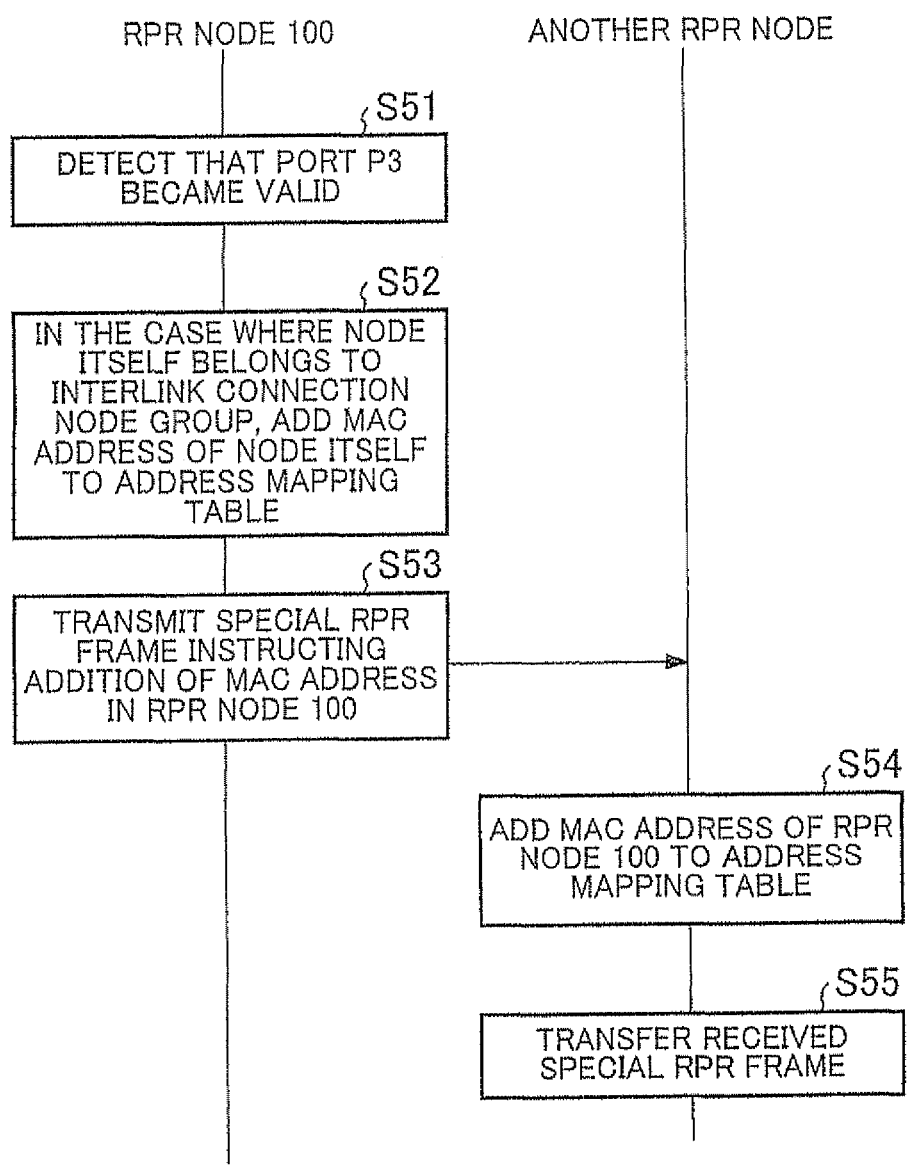

FIG. 14

TDB IN RPR NODE 100

| NODE IDENTIFIER OF RPR NODE | PORT STATE OF PORT P1 | PORT STATE OF PORT P2 | PORT STATE OF PORT P3 |
|---|---|---|---|
| MAC ADDRESS OF RPR NODE 100 | VALID | VALID | INVALID |
| MAC ADDRESS OF RPR NODE 110 | VALID | VALID | VALID |
| MAC ADDRESS OF RPR NODE 120 | VALID | VALID | VALID |
| MAC ADDRESS OF RPR NODE 130 | VALID | VALID | VALID |
| MAC ADDRESS OF RPR NODE 140 | VALID | VALID | VALID |
| MAC ADDRESS OF RPR NODE 150 | VALID | VALID | VALID |
| MAC ADDRESS OF RPR NODE 160 | VALID | VALID | VALID |
| MAC ADDRESS OF RPR NODE 170 | VALID | VALID | VALID |

FIG. 17

FDB FOR RELAY IN EoE NODE 700

| MAC ADDRESS OF DESTINATION | OUTPUT PORT |
|---|---|
| MAC ADDRESS OF EoE NODE 710 | P1 |
| MAC ADDRESS OF EoE NODE 720 | P1 |
| MAC ADDRESS OF EoE NODE 730 | P2 |
| MAC ADDRESS OF EoE NODE 740 | P2 |

COMMUNICATION SYSTEM, COMMUNICATION METHOD, NODE, AND PROGRAM FOR NODE

TECHNICAL FIELD

The present invention relates to a communication system, a communication method, a node, and a program for a node. More particularly, the invention relates to a reliable communication system, and a communication method, a node, and a program for a node applied to such a communication system.

BACKGROUND ART

In recent years, with spread of the Internet, the traffic amount of a trunk communication system increases rapidly. In particular, the traffic amount in a link connecting networks constructing the trunk communication system (herein below, described as "interlink") is enormous. Therefore, to continuously provide stable communication, a high-reliable technique of suppressing occurrence of congestion caused by concentration of traffic and avoiding interruption of communication due to abnormality such as disconnection of an interlink, trouble in any of nodes at both ends of the interlink (herein below, called "interlink connection nodes"), and the like is extremely important.

In the following, as an example of a network realizing a high-reliable trunk communication system, a network system (herein below, called "RPR network") to which RPR (Resilient Packet Ring) disclosed in non-patent document 1 is applied will be taken. A technique of improving reliability of an interlink connecting a plurality of RPR networks will be described. The non-patent document 1 is a standardized document issued from IEEE (the Institute of Electrical and Electronics Engineers) in 2004.

FIG. 19 is a diagram illustrating an example of the RPR network. The RPR is a network protocol for transferring a frame (packet) on a network of a ring topology as shown in FIG. 19.

In a communication system as shown in FIG. 19, the RPR network is constructed by eight nodes that operate in conformity with the RPR (herein below, described as "RPR nodes"), and one terminal is accommodated under command of each of the RPR nodes. The expression "a terminal is accommodated under command of an RPR node" denotes that, to the RPR node, a terminal which does not belong to a ring network to which the RPR node belongs is connected. A terminal may belong to a ring network other than the ring network to which the RPR node belongs or may belong to the other communication network. A terminal accommodated under command of an RPR node will be also simply described as a terminal under command.

In the example of FIG. 19, each of RPR nodes 800 to 870 has ports P1 to P3. Each of the RPR nodes 800 to 870 transmits/receives an RPR frame to/from a neighboring RPR node by using the ports P1 and P2. Each of terminals 1300 to 1370 has a port P1. Each of the RPR nodes and a terminal connected to the RRP node transmit/receive a frame (Ethernet frame) by using the port P3 of the RPR node and the port P1 of the terminal. For information, Ethernet is a registered trademark.

As a main feature of the RPR, a high-speed protection function is widely known. For example, in the case where a link between RPR nodes is disconnected in an RPR network, immediately after the RPR nodes on both sides of the link detect the disconnection, a message of the disconnection is promptly notified to all of the other RPR nodes. The other RPR nodes which have received the notification of occurrence of the failure shift to an operation state of transmitting traffic so as to bypass the link disconnected part. As a result, the communication can be performed continuously.

The RPR is designed to recover communication in short time of 50 ms or less equivalent to that in the SDH (Synchronous Digital Hierarchy) or SONET (Synchronous Optical Network) on precondition that it is employed for a trunk communication system in which traffic of large volume flows like an urban network. Consequently, a high-reliable communication system can be constructed.

As a conventional technique for improving the reliability of an interlink connecting two RPR networks, there is link aggregation (herein below, described as "LAG") disclosed in non-patent document 2. The non-patent document 2 is also a standardized document issued by IEEE.

The LAG is a technique of virtualizing a plurality of physical ports as a single logical port. In other words, it is a technique of virtualizing a plurality of links as a single logical link. By applying the LAG, in a normal state where no failure occurs, traffic is transmitted so as to be spread in the plurality of physical links belonging to the logical link. In such a manner, the communication band of the links can be increased to the sum of the communication bands of the physical links belonging to the logical link at the maximum. In an abnormal state where a physical link belonging to the logical link is disconnected, the communication can be continued by transferring the frames using only the other normal physical links in which no failure occurs.

FIG. 20 is an explanatory diagram showing an example of applying LAG to connection of RPR networks. In a communication system shown in FIG. 20, an RPR network 805 and an RPR network 905 are connected to each other. In the example shown in FIG. 20, each of an RPR node 800 belonging to the RPR network 805 and an RPR node 900 belonging to the RPR network 905 has ports P1 to P3 and, in addition, a port P4. The LAG is set in the ports P3 and P4 of the RPR node 800. Similarly, the LAG is set also in the ports P3 and P4 of the RPR node 900. The port P3 of the RPR node 800 and the port P4 of the PRP node 900 are connected via an interlink 491. The port P4 of the RPR node 800 and the port P3 of the RPR node 900 are connected via an interlink 492. With such a configuration, in the example shown in FIG. 20, the reliability of the connection between the RPR networks 805 and 905 is improved.

A technique of increasing the reliability of connection between two RPR networks is disclosed in patent document 1. FIG. 21 is an explanatory diagram showing the configuration of a network described in the patent document 1. In the network described in the patent document 1, as shown in FIG. 21, the RPR nodes 800 and 900 are disposed so as to belong to both of the RPR networks 805 and 905. One of the RPR nodes 800 and 900 performs, as an active node, frame transfer between the RPR network 805 and the RPR network 905. The other node is set, as a spare node, not to perform the frame transfer between the RPR networks. In the case where the spare node detects trouble in the active node, the spare node shifts to an operation mode of transferring frames between the RPR networks. The data in forwarding databases in all of the RPR nodes other than the RPR nodes 800 and 900 is erased. As a result, traffic transferred via the active node is transferred via the spare node. Consequently, even if trouble occurs in the active node, the communication can be performed continuously.

Patent document 2 describes a communication network system in which two ring networks are connected to each other. In the communication network system described in the patent document 2, a plurality of inter-ring connection node devices in a ring network and a plurality of inter-ring connection node devices in other ring network are connected.

Patent document 3 describes a method of connecting networks using a representative protocol address.

Patent document 1: Japanese Patent Application Laid-Open (JP-A) No. 2003-258822 (paragraphs 0015 to 0085, FIG. 1)

Patent document 2: JP-A-2000-4248 (paragraphs 0073 to 0076)

Patent document 3: Japanese Patent Publication No. 3599476 (paragraph 0068)

Non-patent document 1: "IEEE Standards 802.17 Part 17: Resilient packet ring (RPR) access method & physical layer specifications", "5. Architecture Overview", IEEE (Institute of Electrical and Electronics Engineers, Inc., 2004, p. 27-54)

Non-patent document 2: "IEEE Std 802.3ad Amendment to Carrier Sense Multiple Access with Collision Detection (CSMA/CD) Access Method and Physical Layer Specifications", "43. Link Aggregation", IEEE (Institute of Electrical and Electronics Engineers, Inc), 2000, p. 95-107

DISCLOSURE OF THE INVENTION

Problems to be Solved by the Invention

The LAG, however, has the following drawback. By application of LAG, physical ports which can be virtualized as a single logical port are limited to physical ports belonging to a single node. Consequently, when one of nodes at both ends of a link fails, a problem occurs such that communication is interrupted. For example, in the communication system illustrated in FIG. 20, when one of the RPR nodes 800 and 900 fails, all of communications between the RPR networks 805 and 905 stop.

In the communication system descried in the patent document 1, although a plurality of connection points of a network exist, frames are transferred only at any one of the connection points. Therefore, it is difficult to suppress occurrence of congestion.

An object of the present invention is to provide a communication system in which an interlink connecting networks and a link connecting a network and a terminal have high reliability, a communication method applied for such a communication system, a node, and a program for a node. Other object is to provide a communication system, a communication method, a node, and a program for a node capable of performing communications even if trouble occurs in a node disposed at one end of an interlink.

Further other object of the present invention is to provide a communication system, a communication method, a node, and a program for a node capable of suppressing occurrence of congestion.

Means for Solving the Problems

A communication system according to the present invention has a plurality of networks to each of which a first node and a second node are connected. The first node is assigned to a common virtual address indicating that the first node belongs to a group. The second node is connected to a terminal transmitting/receiving a terminal frame and does not belong to the group. The first node in each of the networks is set a link to the first node of the other network. The second node of each of the networks has: a database managing unit recording relationship between a physical address or a virtual address of the nodes and an address of the terminal in a database on the basis of transfer history of a terminal frame; a frame generator generating a network frame in which a terminal frame received from the terminal is contained; and a switch processing unit transmitting the network frame to its own network. The frame generator retrieves an address corresponding to a destination of the terminal frame received from the terminal from the database and determines, when the retrieved address is the virtual address, a physical address of any one of the first nodes in its own network as a destination of the network frame.

The frame generator may determine an address as the destination of the network frame in accordance with information included in the terminal frame received from the terminal.

The frame generator may recognize a first node whose link to the other network is normal, and determines the physical address of the recognized first node as the destination of the network frame.

The first node may have a monitoring unit monitoring state of the link to the other network, and an address managing unit notifying the other nodes of information on an instruction to exclude said first node from candidates of the destination of the network frame when trouble occurs in the monitored link.

The frame generator may recognize a first node whose state of communication with a neighboring node is normal, and determine the physical address of the recognized first node as the destination of the network frame.

The first node may have a monitoring unit monitoring state of communication with the neighboring node, and an address managing unit notifying the other nodes of information on an instruction to exclude said first node from candidates of the destination of the network frame when trouble occurs in the monitored communication with the neighboring node.

A communication system according to the present invention has a plurality of networks to each of which a first node and a second node are connected. The first node is assigned to a common virtual address indicating that the first node belongs to a group. The second node is connected to a terminal transmitting/receiving a terminal frame and does not belong to the group. The second node of each of the networks has: a database managing unit recording relationship between a physical address or a virtual address of the nodes and an address of the terminal in a database on the basis of transfer history of a terminal frame; a frame generator generating a network frame in which a terminal frame received from the terminal is contained; and a switch processing unit transmitting the network frame to its own network. The frame generator retrieves an address corresponding to a destination of the terminal frame received from the terminal from the database and sets, when the retrieved address is the virtual address, destination of multicast communication to all of the first nodes to which the virtual address are assigned as the destination of the network frame. The first node in each of the networks is set a link to the first node of the other network, and has a switch processing unit determining, when receiving a network frame in which destination of multicast communication is set, whether to transmit or not a terminal frame contained in the received network frame to the link to the other network, and a frame extracting unit extracting the terminal frame to be transmitted to the link from the network frame and transmitting the extracted terminal frame.

The switch processing unit of the first node may determine, according to information included in a received network frame or information included in a terminal frame in the network frame, whether to transmit or not the terminal frame.

The first node transmitting the terminal frame to the link may be any one of the first nodes whose links to the other network are normal and belonging to the group.

The switch processing unit may determine, when receiving a network frame in which a virtual address of its own group is set as a transmitter address and an address of broadcast communication is set as a destination address, not to transmit a terminal frame contained in the network frame to the link to the other network.

The switch processing unit of the first node may determines, when receiving a network frame in which an address of broadcast communication is set as a destination address and a physical address of a second node is set as a transmitter address, whether to transmit or not the network frame to a link to the other network. The switch processing unit in any one of the first nodes belonging to the group may determine to transmit the terminal frame.

The switch processing unit in the first node determines, according to information included in a network frame in which an address of broadcast communication is set as a destination address and a physical address of a second node is set as a transmitter address or information included in a terminal frame in the network frame, whether to transmit or not the terminal frame to the link.

The first node transmitting the terminal frame to the link may be any one of first nodes whose links to the other network are normal and belonging to the group.

The first node may have a frame generator generating a network frame in which a common virtual address assigned to said first node itself as a transmitter and a terminal frame received from a link to the other network are contained. The switch processing unit of said first node transmits the network frame generated by the frame generator to its own network.

Any of the plurality of networks may be an RPR (Resilient Packet Ring) network or an EoE (Ethernet over Ethernet) network.

Each of the plurality of networks may be an RPR network or an EoE network.

Each of nodes belonging to a group may be connected to a first node of the other network in a one-to-one correspondence.

The communication system may further include a terminal linked to each of the first nodes belonging to a group. The terminal may transmit/receive a terminal frame to/from any of the first nodes of the group.

The terminal may determine a first node to which a terminal frame is transmitted according to information included in the terminal frame.

The terminal may recognize a first node whose state of communication to a neighboring node is normal, and determine the node as a first node to which a terminal frame is to be transmitted.

The first node may notify a terminal linked to said first node itself of information on a state of communication between said first node itself and a neighboring node.

The present invention also provides a communication method of a system including a plurality of networks to each of which a first node and a second node are connected. The first node is assigned to a common virtual address indicating that the first node belongs to a group. The second node is connected to a terminal transmitting/receiving a terminal frame and does not belong to the group. The first node in each of the networks is set a link to the first node of the other network. The method comprising the steps carried out by the second node of each of the networks of recording relationship between a physical address or a virtual address of the nodes and an address of the terminal in a database on the basis of transfer history of a terminal frame, generating a network frame in which a terminal frame received from the terminal is contained, retrieving an address corresponding to a destination of the terminal frame received from the terminal from the database, determining, when the retrieved address is the virtual address, a physical address of any one of the first nodes in the network of said second node as a destination of the network frame, and transmitting the network frame whose destination is determined to the network of said second node.

The present invention also provides a communication method of a system including a plurality of networks to each of which a first node and a second node are connected. The first node is assigned to a common virtual address indicating that the first node belongs to a group. The second node is connected to a terminal transmitting/receiving a terminal frame and does not belong to the group. The method comprising the steps carried out by the second node of each of the networks of: recording relationship between a physical address or a virtual address of the nodes and an address of the terminal in a database on the basis of transfer history of a terminal frame; generating a network frame in which a terminal frame received from the terminal is contained; retrieving an address corresponding to a destination of the terminal frame received from the terminal from the database; setting, when the retrieved address is the virtual address, destination of multicast communication to all of the first nodes to which the virtual address are assigned as the destination of the network frame; and transmitting the network frame to the network of said second node. The method includes the steps carried out by the first node of each of the networks of: being set a link to the first node of the other network; determining, when receiving a network frame in which destination of multicast communication is set, whether to transmit or not a terminal frame contained in the received network frame to the link to the other network; and extracting the terminal frame to be transmitted to the link from the network frame and transmitting the extracted terminal frame.

A node according to the present invention is a second node in a system including a plurality of networks to each of which a first node and the second node are connected. The first node is assigned to a common virtual address indicating that the first node belongs to a group and sets a link to the first node of the other network. The second node is connected to a terminal transmitting/receiving a terminal frame and does not belong to the group. The second node includes: a database managing unit recording relationship between a physical address or a virtual address of the nodes and an address of the terminal in a database on the basis of transfer history of a terminal frame; a frame generator generating a network frame in which a terminal frame received from the terminal is contained; and a switch processing unit transmitting the network frame to its own network. The frame generator retrieves an address corresponding to a destination of the terminal frame received from the terminal from the database and determines, when the retrieved address is the virtual address, a physical address of any one of the first nodes in its own network as a destination of the network frame.

A program according to the present invention makes a computer function as the node.

A node according to the present invention is a first node in a system including a plurality of networks to each of which a first node and the second node are connected. The first node is assigned to a common virtual address indicating that the first node belongs to a group and sets a link to the first node of the other network. The second node is connected to a terminal transmitting/receiving a terminal frame and does not belong to the group. The first node includes: a switch processing unit determining, when receiving a network frame in which destination of multicast communication for a group to which the first node belongs is set, whether to transmit or not a terminal frame contained in the received network frame to the link to the other network, and a frame extracting unit extracting the terminal frame to be transmitted to the link from the network frame and transmitting the extracted terminal frame.

A program for a node according to the present invention makes a computer function as the node.

According to the present invention, first nodes belonging to a group are connected to first nodes in other network via links. Therefore, the networks are connected to each other via a plurality of links. Thus, reliability of communication of a link between networks can be increased. Since the networks are connected via the plurality of links, a communication band between the networks can be enlarged.

When a second node which does not belong to the group determines one destination of a network frame, the destination is determined according to information included in a terminal frame. Therefore, the same address can be prevented from being always determined. Accordingly, congestion caused by transmission of a network frame only to a specific first node can be prevented.

At the time of determining the destination address of a network frame, the second node which does not belong to the group selects the address of a node in which no failure occurs from the first nodes belonging to the group. Therefore, transmission of the network frame to a first node in which trouble occurs can be prevented. Thus, even if trouble occurs in any of the first nodes, by selecting other first node, the communication can be continued.

When a network frame is multicast-transmitted to the first nodes, it is determined that only any one of the first nodes transmits the terminal frame in the network frame to a link to the other network. Therefore, by determining whether the first node transmits a terminal frame or not in accordance with information included in a network frame or information included in the terminal frame, the same first node can be prevented from being always a node for transmitting a terminal frame to a link to the other network. Thus, occurrence of congestion in the link can be prevented.

Since a common virtual address assigned to a group is set for the first nodes in each network in addition to the physical address of the node, the first nodes are grouped. Since arbitrary nodes can be grouped as first nodes, the interlinks are not much limited by positions of station facilities, link laying places, and the like. Therefore, a plurality of interlinks can be disposed in arbitrary positions.

Effect of the Invention

In the communication system of the present invention, first nodes belonging to a group in a network are connected to first nodes in other network via links. With the configuration, the reliability of communication between the networks is increased, and the communication band between the networks can be enlarged.

BRIEF DESCRIPTION OF DRAWINGS

FIG. 3 is a block diagram showing an example of the configuration of an RPR node;

FIG. 4 is an explanatory diagram showing an example of a corresponding relation registered in an FDB;

FIG. 5 is an explanatory diagram showing an example of information registered in a TDB;

FIG. 6 is an explanatory diagram showing an example of information registered in an interlink connection node group table;

FIG. 7 is an explanatory diagram showing an example of information registered in an address mapping table;

FIG. 8 is an explanatory diagram showing an example of information stored in an MAC address management table;

FIG. 9 is a flowchart showing processes in an operation of transmitting an Ethernet frame to a terminal under an interlink connection node;

FIG. 10 is a flowchart showing an example of processes of an RPR node that receives an Ethernet frame addressed to a terminal under an RPR node belonging to an RPR network;

FIG. 11 is a flowchart showing an example of processes in the case where an interlink connection node belonging to an interlink connection node group receives an RPR frame which is multicast-transmitted;

FIG. 12 is a flowchart showing an example of operation of an RPR node belonging to an RPR network in the case where trouble occurs in an interlink;

FIG. 13 is a flowchart showing an example of operation of an RPR node belonging to an RPR network in the case where trouble in an interlink is repaired;

FIG. 14 is an explanatory diagram showing an example of information registered in a TDB;

FIG. 17 is an explanatory diagram showing an example of corresponding relations registered in an FDB for relay;

DESCRIPTION OF REFERENCE NUMERALS

Figure 1:
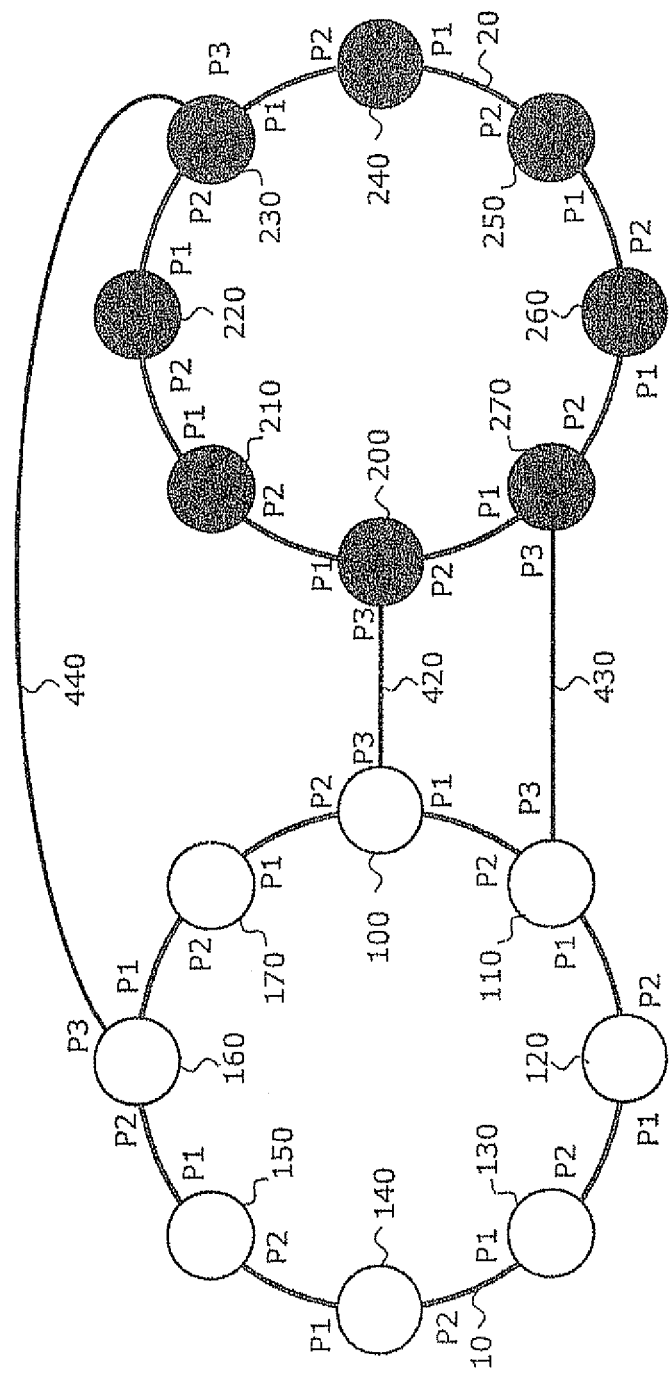
FIG. 1 is an explanatory diagram showing a first embodiment of a communication system according to the present invention.

10, 20 RPR networks
100-170, 200-270 RPR nodes
420, 430, 440 interlinks
500-1, 500-2, 500-3 input ports
510-1, 510-2 frame analyzers
530 RPR switch processing unit
540 FDB
550 FDB managing unit 560 TDB
570 Ethernet frame extracting unit
580-1, 580-2, 580-3 output ports
590 interlink connection node group table
600 address mapping table
610 address mapping table managing unit
620 port state monitoring unit
630 MAC address management table

BEST MODE FOR CARRYING OUT THE INVENTION

Embodiments of the present invention will be described below with reference to the drawings.

First Embodiment

FIG. 1 is an explanatory diagram showing a first embodiment of a communication system according to the present invention. The communication system of the first embodiment has an RPR network 10 and an RPR network 20 each including RPR nodes. As described above, the RPR network is a network system to which the RPR is applied.

The RPR node is a node that operates in conformity with "IEEE Standards 802.17". The RPR nodes of the communication system of the present invention (RPR nodes 100 to 170 and 200 to 270 in the example shown in FIG. 1) perform operation in conformity with "IEEE Standards 802.17" and also perform other operations (operations for realizing the objects of the present invention).

The RPR networks 10 and 20 are connected to each other via interlinks 420, 430, and 440. An interlink is a link connecting nodes in different networks (in the example, the networks 10 and 20) of the communication system.

Each of the RPR nodes of the first embodiment has three ports P1, P2, and P3. The ports P1 and P2 are ports for transmitting/receiving an RPR frame. Each of the RPR nodes 100 to 170 and 200 to 270 transmits/receives an RPR frame to/from a neighboring RPR node by using the ports P1 and P2. The port P3 is a port for transmitting/receiving an Ethernet frame to/from a terminal accommodated under the node. An Ethernet frame is a communication frame corresponding to a terminal frame in the present invention.

The interlink 420 connecting the RPR networks 10 and 20 is provided between the port P3 of the RPR node 100 and the port P3 of the RPR node 200. Similarly, the interlink 430 is provided between the port P3 of the RPR node 110 and the port P3 of the RPR node 270. The interlink 440 is provided between the port P3 of the RPR node 160 and the port P3 of the RPR node 230. In the following description, nodes disposed at both ends of any interlink will be referred to as "interlink connection nodes". In the example shown in FIG. 1, the RPR nodes 100 and 200, the RPR nodes 110 and 270, and the RPR nodes 160 and 230 are interlink connection nodes.

The RPR nodes 100, 110, and 160 belonging to the RPR network 10 and the RPR nodes 200, 270, and 230 belonging to the RPR network 20 are connected to each other in a one-to-one manner via the interlinks 420, 430, and 440, respectively.

For the interlink connection nodes 100, 110, and 160 in the RPR network 10, the interlink connection nodes 200, 270, and 230 in the RPR network 20 correspond to terminals under them, respectively. Similarly, for the interlink connection nodes 200, 270, and 230 in the RPR network 20, the interlink connection nodes 100, 110, and 160 in the RPR network 10 correspond to terminals under them, respectively.

Figure 19:
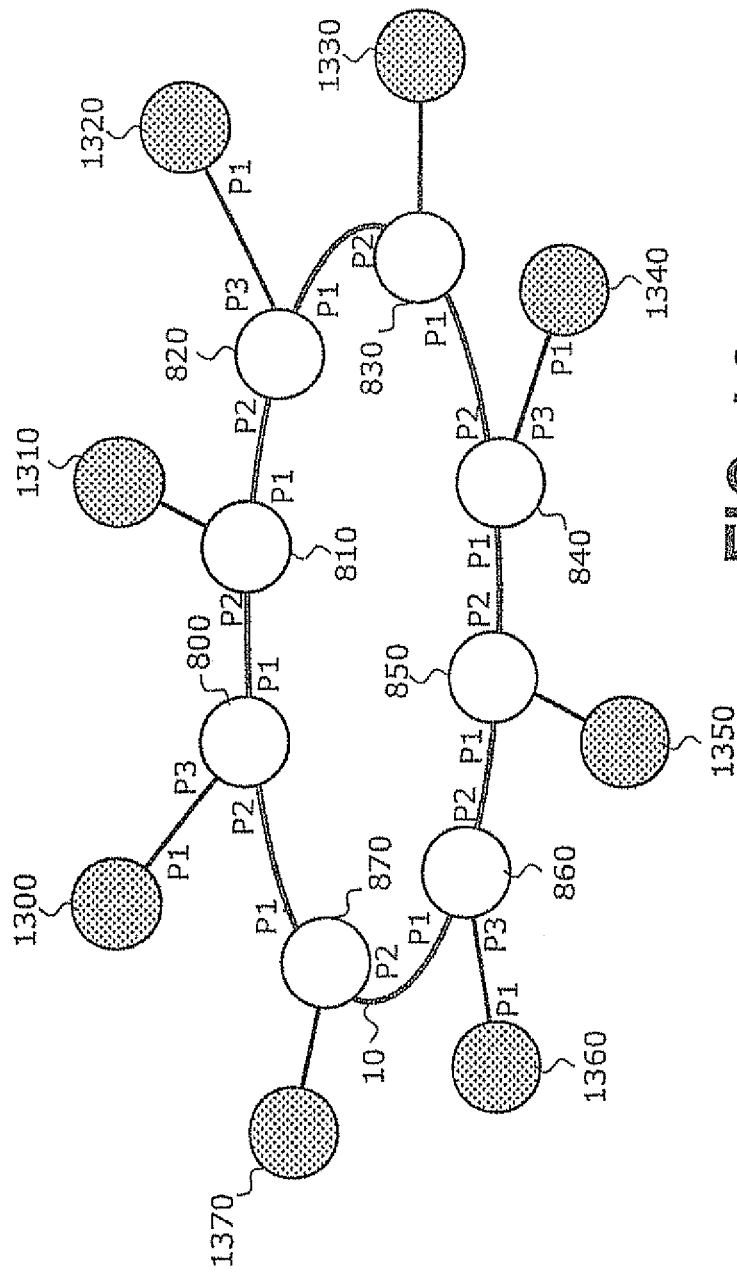
FIG. 19 is an explanatory diagram showing an example of an RPR network.
Figure 20:
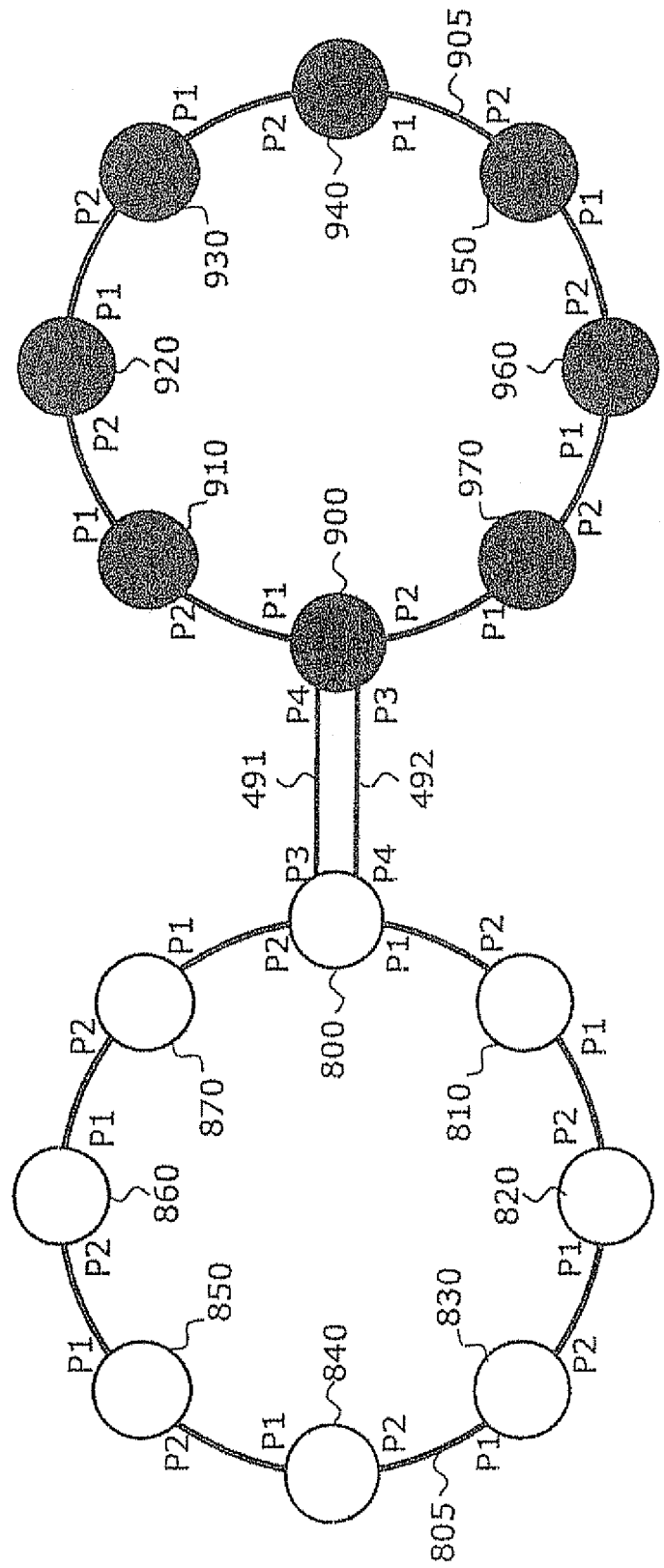
FIG. 20 is an explanatory diagram showing an example of applying LAG to connection of RPR networks.
Figure 21:
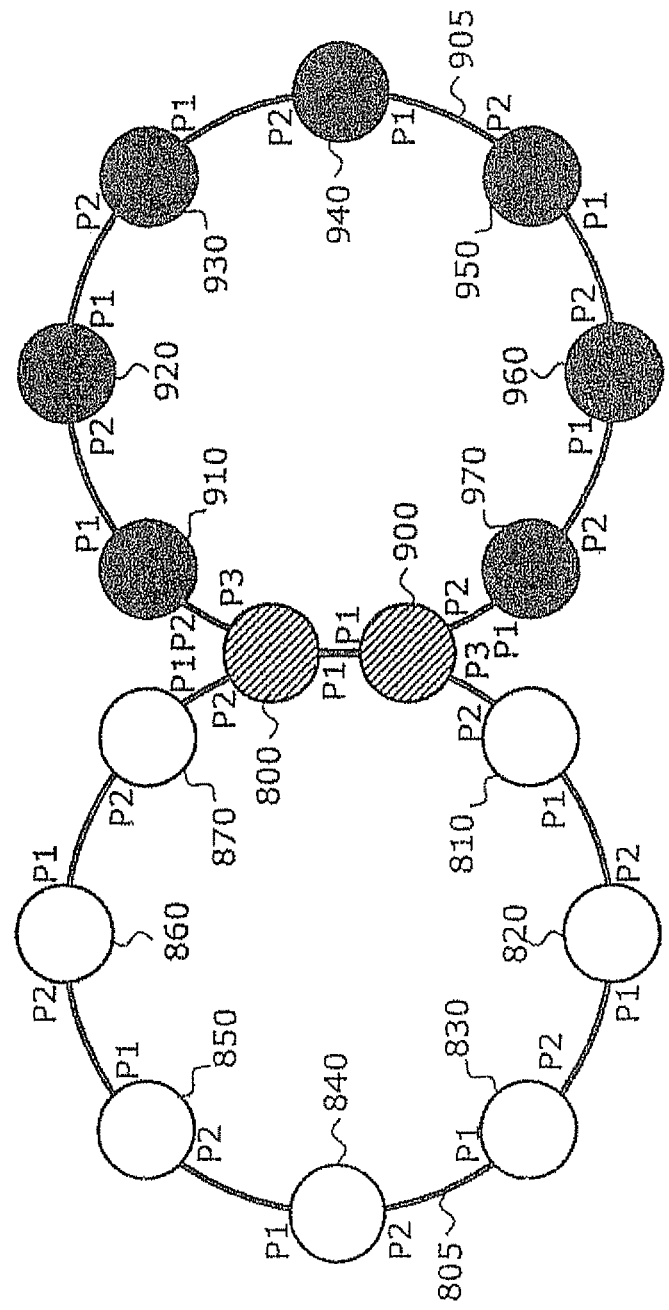
FIG. 21 is an explanatory diagram showing an example of the configuration of a conventional network.

Although not shown in FIG. 1, like the RPR network shown in FIG. 19, a terminal is accommodated under the port 3 of each of the RPR nodes 120, 130, 140, 150, 170, 210, 220, 240, 250, and 260 excluding the RPR nodes 100, 110, 160, 200, 230, and 270 as the interlink connection nodes.

Other node or other network may be connected to a terminal accommodated under any of the RPR nodes 120, 130, 140, 150, 170, 210, 220, 240, 250, and 260 except for the interlink connection nodes. In this case, when a loop is formed between the terminals under the nodes, a broadcast storm occurs due to the loop, and a problem occurs such that communication becomes unstable. It is therefore desirable to avoid formation of a loop by the terminals under the RPR nodes except for the interlink connection nodes.

Figure 2:
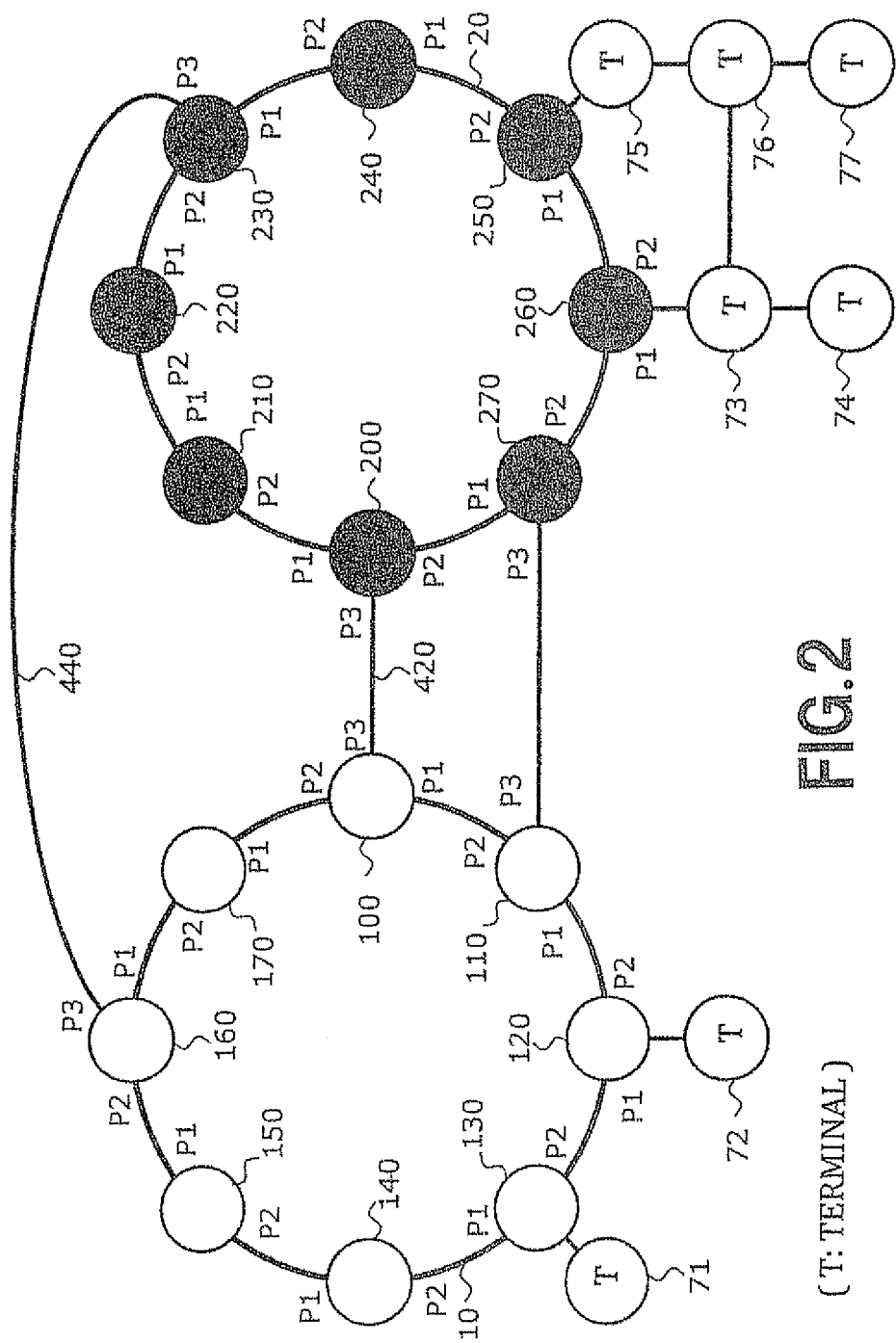
FIG. 2 is an explanatory diagram showing an example of an improper connection mode of terminals.

FIG. 2 is an explanatory diagram showing an example of an improper connection mode of terminals. As shown in FIG. 2, a terminal 71 is connected to the RPR node 130, and a terminal 72 is connected to the RPR node 120. A terminal 73 is connected to the RPR node 260, and a terminal 74 is connected to the terminal 73. A terminal 75 is connected to the RPR node 250, a terminal 76 is connected to the terminal 75, and a terminal 77 is connected to the terminal 76. The terminals 73 and 76 are connected to each other. In the connection mode shown in FIG. 2, a loop including the RPR nodes 250 and 260 and the terminals 73 and 76 excluding the interlink connection nodes is formed. In this case, a broadcast storm may occur. Even when communication between the terminals 71 and 72 is possible, a problem that the communication becomes unstable occurs like a case where the communication between the terminals 74 and 72 via the RPR node 260 and the like included in the loop cannot be performed. Therefore, formation of the loop including the RPR nodes 250 and 260 and the terminals 73 and 76 as illustrated in FIG. 2 is non-preferable.

In the communication system shown in FIG. 1, the RPR frame is transmitted/received between RPR nodes belonging to the same RPR network. The RPR frame is a communication frame corresponding to a system frame in the present invention. An Ethernet frame is transmitted/received between an RPR node and a terminal accommodated under the RPR node. An Ethernet frame is transmitted/received between interlink connection nodes belonging to different RPR networks. The RPR frame is an encapsulated frame by storing an Ethernet frame in a payload. In the header of an RPR frame, addresses of a transmitter and a destination and TTL (Time to Live) are included. In an RPR frame, as the addresses of a transmitter and a destination, the address of an RPR node, the address of broadcast transmission, or the address indicative of multicast transmission is included.

Next, the configuration of the RPR node will be described. FIG. 3 is a block diagram showing an example of the configuration of an RPR node provided for the communication system shown in FIG. 1. The RPR node 100 shown in FIG. 1 will be described as an example. The configuration of each of the other RPR nodes 110 to 170 and the RPR nodes 200 to 270 is similar to that of the RPR node 100.

As shown in FIG. 3, the RPR node 100 has input ports 500-1 to 500-3, frame analyzers 510-1 and 510-2, an RPR frame generator 520, an RPR switch processing unit 530, an FDB 540, an FDB managing unit 550, a TDB (Topology DataBase) 560, an Ethernet frame extracting unit 570, output ports 530-1 to 580-3, an interlink connection node group table 590, an address mapping table 600, an address mapping table managing unit 610, a port state monitoring unit 620, and an MAC address management table 630.

The input ports 500-1 to 500-3 of the RPR node 100 are ports corresponding to the reception side of the ports P1 to P3 of the RPR node 100 shown in FIG. 1. The input ports 500-1 and 500-2 are ports for receiving the RPR frames transmitted from the neighboring RPR nodes. The input port 500-3 is a port for receiving an Ethernet frame transmitted from a terminal under the node.

The input port 500-1 of the RPR node 100 of the embodiment receives an RPR frame transmitted from the output port 580-2 of the RPR node 110 neighboring in the clockwise direction in FIG. 1.

The input port 500-2 of the RPR node 100 receives an RPR frame transmitted from the output port 580-1 of the RPR node 170 neighboring in the counterclockwise direction.

The input port 500-3 of the RPR node 100 is a port for receiving an Ethernet frame transmitted from a terminal under the node. The RPR node 100 is an interlink connection node, and a terminal under the RPR node 100 is the RPR node 200 belonging to the RPR network 20. Therefore, the input port 500-3 of the RPR node 100 receives an Ethernet frame transmitted from the RPR node 200. For example, the input port 500-3 of the RPR node 120 receives an Ethernet frame transmitted from a terminal (not shown) under the node.

The output ports 580-1 to 580-3 of the RPR node 100 are ports (ports for transmitting frames) corresponding to the transmission side in the ports P1 to P3 of the RPR node 100 shown in FIG. 1. The output ports 500-1 and 500-2 are ports for transmitting an RPR frame to the neighboring RPR node. The output port 500-3 is a port for transmitting an Ethernet frame to a terminal under the node.

The output port 580-1 of the RPR node 100 transmits an RPR frame to the input port 500-2 of the RPR node 110 neighboring in the clockwise direction in FIG. 1.

The output port 580-2 of the RPR node 100 transmits an RPR frame to the input port 500-1 of the RPR node 170 neighboring in the counterclockwise direction.

The output port 580-3 is a port for transmitting an Ethernet frame to a terminal under the node. For example, the output port 580-3 of the RPR node 100 transmits an Ethernet frame to the RPR node 200 as the terminal under the node 100. For example, the output port 580-3 of the RPR node 120 transmits an Ethernet frame to a terminal (not shown) under the node.

The frame analyzers 510-1 and 510-2 correspond to the input ports 500-1 and 500-2, respectively. To the frame analyzers 510-1 and 510-2, RPR frames are input from the corresponding input ports. The frame analyzers 510-1 and 510-2 send a special RPR frame to the address mapping table managing unit 600 and send RPR frames other than the special frame to the RPR switch processing unit 530.

The special RPR frame is an RPR frame that instructs deletion or addition of an address (MAC address) included in the address mapping table 600 or an RPR frame described below.

Interlink connection nodes belonging to the same RPR network are set in a group (called "interlink connection node group"). An Ethernet frame contained in an RPR frame, which is broadcast transmitted or is multicast-transmitted to the RPR nodes of the group, is transmitted to the other RPR network by any one of the interlink connection nodes belonging to the group. An interlink connection node for transmitting the Ethernet frame to the other RPR network and an RPR frame for instructing a change in the criterion also correspond to the special RPR frame.

The special RPR frame is a kind of a control frame which is not described in the standardized document (non-patent document 1).

To the RPR frame generator 520, the Ethernet frame is input from the input port 500-3. The RPR frame generator 520 encapsulates the input Ethernet frame, thereby generating an RPR frame.

The RPR switch processing unit 530 performs processes related to RPR defined in "IEEE Standards 802.17".

Examples of the processes performed by the RPR switch processing unit 530 include transfer of an RPR frame received from a neighboring RPR node, management of topology information of an RPR network according to the topology discovery protocol, dynamic control of a communication band of traffic on an RPR network by the fairness function, and management of the RPR network by OAM (Operations, Administration, and Maintenance).

In the following, the details of the processes of the RPR switch processing unit 530 will not be described except for operations closely related to operations of a node in the present invention.

The FDB 540 is a database that stores the corresponding relation between the MAC address of a terminal and the MAC address of an RPR node and the corresponding relation between the MAC address of a terminal and a virtual MAC address assigned to an interlink connection node group.

In the FDB 540, the corresponding relation between the MAC address of a terminal and the MAC address of an RPR node is registered by the FDB management unit 550 which will be described later. The corresponding relation between the MAC address of a terminal and the virtual MAC address assigned to an interlink connection node group is also registered by the FDB management unit 550. The process of registering the corresponding relations into the FDB 540 during the course of transmission/reception of a data frame will be called MAC address learning.

The interlink connection node group is a group of RPR nodes connected to the other common RPR network or terminal among the interlink connection nodes belonging to the same RPR network. For example, in the RPR network 10 shown in FIG. 1, a group of the interlink connection nodes 100, 110, and 160 connected to the RPR network 20 as other common RPR network is an interlink connection node group. Similarly, a group of the interlink connection nodes 200, 270, and 230 is an interlink connection node group. An MAC address is assigned to an interlink connection node group in a manner similar to an RPR node. A virtual MAC address is an MAC address assigned to an interlink connection node group.

In the present invention, by assigning a virtual MAC address to an interlink connection node group and virtualizing a plurality of interlink connection nodes as a single interlink connection node, the communication band of the interlinks is widened in normal mode. When trouble occurs, by transferring frames by using a normal interlink, communication among networks can be continued.

FIG. 4 is an explanatory diagram showing an example of a corresponding relation registered in the FDB 540 in the RPR node 100. For example, as registered information in the second line from top in FIG. 4, the MAC address of a terminal connected under the RPR node 130 and the MAC address of the RPR node 130 are associated with each other. When the RPR node 100 receives an Ethernet frame whose destination is the MAC address of the terminal connected under the RPR node 130 and generates an RPR frame by encapsulating the Ethernet frame, the RPR node 100 writes the MAC address of the RPR node 130 as the MAC address of the destination of the RPR frame.

Although not shown in FIG. 4, the MAC address of a terminal and a virtual MAC address may be registered so as to be associated with each other in the FDB 540. For example, the corresponding relation between the MAC address of the terminal under the RPR node 140 belonging to the RPR network 10 and a virtual MAC address assigned to an interlink connection node group of the RPR network 20 is registered in the FDB 540 of the RPR node belonging to the RPR network 20. In the examples it is assumed that the RPR node belonging to the RPR network 20 transfers an Ethernet frame from a terminal under the node itself to a terminal under the RPR node 140. In this case, the RPR node belonging to the RPR network 20 determines the destination MAC address of the RPR frame with reference to a virtual address associated with the MAC address of the terminal under the RPR node 140.

The FDB management unit 550 updates data registered in the FDB 540 in accordance with various states of its node (the RPR node having the FDB management unit 550) or a request from other component of its node. For example, according to a request from the Ethernet frame extracting unit 570, the FDB managing unit 550 of the RPR node 100 registers the corresponding relation between the MAC address of a terminal and the MAC address of an RPR node accommodating the terminal or the corresponding relation between the MAC address of the terminal and a virtual MAC address assigned to an interlink connection node group in the FDB 540. Concretely, the FDB managing unit 550 registers the corresponding relation between the MAC address of a transmitter of an RPR frame received by its node (the MAC address of the RPR node or the virtual MAC address) and the MAC address of the transmitter of an Ethernet frame encapsulated in the RPR frame (the MAC address of the terminal) in the FDB 540. In accordance with a request from other component of the RPR node 100, the data in the FDB 540 is updated.

The TDB 560 is a database for managing information such as the state of topology of an RPR network to which the node of the TDB 560 (the RPR node having the TDB 560) belongs and trouble occurrence state. For example, the TDB 560 of the RPR node 100 is a database for managing the topology state of the RPR network 10 and the like.

The information related to the RPR network registered in the TDB 560 is managed by the RPR switch processing unit 530 according to the topology discovery protocol.

FIG. 5 is an explanatory diagram showing an example of information registered in the TDB 560 in the RPR node 100. In the example of the TDB 560 shown in FIG. 5, information indicating whether the state of each of the ports P1 and P2 of each of the RPR nodes belonging to the RPR network 10 is valid or invalid is registered. "Valid" means a state where the port can be operated. "Invalid" means a state where the port cannot be operated. In the TDB 560, information indicative of the states of the ports P1 and P2 is also registered so as to be associated with the node identifier of an RPR node. As the node identifier of an RPR node, the MAC address of the RPR node is used.

In the TDB shown in FIG. 5, for example, the port state of the port P1 of the RPR node 140 is valid, and the port state of the port P2 of the RPR node 140 is invalid. It indicates that the RPR node 140 can transmit/receive an RPR frame by the port P1 but cannot transmit/receive an RPR frame by the port P2.

In the example of FIG. 5, it shows that the port state of the port P1 of the RPR node 150 is invalid. It is understood from the information that trouble occurs in a link connecting the RPR nodes 140 and 150 for some reason.

The port states of the other nodes are registered as follows. Each of the RPR nodes broadcast-transmits TP frames (Topology and Protection frames) storing the states of the ports P1 and p2 at predetermined time intervals in order to control the topology of the RPR network. The RPR switch processing unit 530 updates the states of the ports P1 and P2 of the RPR nodes registered in the TDB 560 with reference to the TP frames sent from the RPR nodes. The states of the ports P1 and P2 of the node of the TDB 560 registered in the TDB 560 are updated by the port state monitoring unit 620. That is, the port state monitoring unit 620 monitors the states of the ports P1 and P2 of its node and registers and updates the states in the TDB 560.

In the example shown in FIG. 5, to simplify the explanation, only the information indicating whether the port state of the RR node is valid or not is shown. In a TDB defined in "IEEE Standards 802.17", various information related to RPR nodes constructing an RPR network is managed. In the TDB 560, the information which is not shown in FIG. 5 is also registered.

To the Ethernet frame extracting unit 570, an RPR frame is supplied from the RPR switch processing unit 530. The Ethernet frame extracting unit 570 extracts an Ethernet frame contained in the payload of the RPR frame.

The interlink connection node group table 590 stores, as a single interlink connection node group, RPR nodes connected to the other common network or terminal in interlink connection nodes belonging to an RPR network to which the node of the table (the RPR node having the interlink connection node group table 590) belongs. In the case of the communication system shown in FIG. 1, in the interlink connection nodes belonging to the RPR network 10, the RPR nodes connected to the other common RPR network 20 are RPR nodes 100, 110, and 160. Therefore, in the interlink connection node group table 590 of the RPR nodes belonging to the RPR network 10, the group of the RPR nodes 100, 110, and 160 is registered as a single interlink connection node group.

FIG. 6 is an explanatory diagram showing an example of information registered in the interlink connection node group table 590. In the interlink connection node group table 590, the name of an interlink connection node group, the identifier of the group, and the MAC addresses of interlink connection nodes belonging to the group are registered so as to be associated with each other. As the identifier of an interlink connection node group, the virtual MAC address assigned to the interlink connection node group is used. In the example shown in FIG. 6, "A" is registered as the name of the interlink connection node group. A virtual MAC address "a" assigned to the interlink connection node group "A" and the MAC addresses of the interlink connection nodes 100, 110, and 160 belonging to the interlink connection node group "A" are registered so as to be associated with the name "A".

Each of the RPR nodes can determine whether the node itself is an interlink connection node or not depending on whether the MAC address of the node itself is registered in the interlink connection node group table 590 or not.

A plurality of interlink connection node groups may be registered in the interlink connection node group table 590. To avoid formation of a loop, a condition that RPR nodes belonging to different interlink connection node groups are connected to different RPR networks has to be satisfied. That is, a single RPR node should not simultaneously belong to a plurality of interlink connection node groups.

The name of an interlink connection node group, a virtual MAC address, and the MAC address of each of interlink connection nodes are registered to the interlink connection node group table 590 by the administrator of the communication system via a management interface. The management interface is an interface in which information to be registered in the interlink connection node group table 590 and the MAC address management table 630 is input.

The address mapping table 600 stores the correspondence relation between a virtual MAC address assigned to an interlink connection node group registered in the interlink connection node group table 590 and the MAC address of an RPR node belonging to the interlink connection node group.

The MAC address of the RPR node whose MAC address is registered in the interlink connection node group table 590 is registered in the address mapping table 600, so that the RPR node is recognized as the RPR node belonging to the interlink connection node group in a frame transferring process.

FIG. 7 is an explanatory diagram showing an example of information registered in the address mapping table 600. In the example shown in FIG. 7 the correspondence between the virtual MAC address "a" of the interlink connection node group and the MAC addresses of the RPR nodes 100, 110, and 160 belonging to the interlink connection node group is registered.

When registration to the interlink connection node group table 590 is performed by the administrator, the address mapping table managing unit 610 reads the registered information from the interlink connection node group table 590 and registers it into the address mapping table. Therefore, in the initial state, the corresponding relation between the virtual MAC address registered in the interlink connection node group table 590 and the address mapping table 600 and the MAC address of each of the RPR nodes belonging to the interlink connection node group is the same. The information registered in the interlink connection node group table 590 is unchanged unless it is changed by the administrator. On the other hand, the information registered in the address mapping table 600 is changed by the address mapping table managing unit 610 in accordance with occurrence of trouble during operation of the communication system or recovery from trouble.

The name registered in the interlink connection node group table 590 is information which is arbitrarily set by the administrator of the communication system for identification of a group and is not used for actual frame transfer. Consequently, the name of the interlink connection node group may not be registered in the address mapping table 600.

The address mapping table managing unit 610 updates the data in the address mapping table 600.

The address mapping table managing unit 610 updates the data in the address mapping table 600 in association with a change in information registered in the interlink connection node group table 590. It is assumed that the MAC address of an interlink connection node corresponding to a virtual MAC address in the interlink connection node group table 590 is additionally registered by the administrator. The address mapping table managing unit 610 registers the MAC address of the interlink connection node additionally registered in the interlink connection node group table 590 into the address mapping table 600 so as to be associated with the virtual MAC address.

In The address mapping table managing unit 610 updates the data in the address mapping table 600 with a change in the data registered in the TDB 560 and a change in the states of the input port 500-3 and the output port 580-3.

The port state monitoring unit 620 monitors the states of the input port 500-1 to 500-3 and the output ports 580-1 to 580-3 of its node (the RPR node having the port state monitoring unit 620) and updates the TDB 560 of its node in accordance with the states.

The port state monitoring unit 620 notifies the states of the input ports 500-1 to 500-3 and the output ports 580-1 to 580-3 of its node to the address mapping table managing unit 610 of its node.

The MAC address management table 630 stores the MAC address assigned to its node (the RPR node having the MAC address management table 630). FIG. 8 shows the MAC address management table 630 of the RPR node 100. As shown in FIG. 8, the MAC address management table 630 of the RPR node 100 stores the MAC address of its node (RPR node 100). The MAC address is registered to the MAC address management table 630 via the management interface by the administrator of the communication system.

The MAC address stored in the MAC address management table 630 is referred to by other component of the RPR node. At least the RPR switch processing unit 530 and the address mapping table managing unit 610 refer to the MAC addresses stored in the MAC address management table 630.

The operations of the embodiment will be described. First, the operation in the normal mode will be described. Concretely, an operation of transmitting/receiving an Ethernet frame between terminals via any one of the interlinks 420, 430, and 440 in the normal mode will be described. The case where a terminal (not shown in FIG. 1) under the RPR node 140 and a terminal (not shown in FIG. 1) under the RPR node 240 transmit/receive frames to/from each other will be described as an example.

In the following, an example of frame transfer from a terminal under the RPR node 140 to a terminal under the RPR node 240 in the case where the FDB 540 does not perform MAC address learning will be described. Frame transfer from a terminal under the RPR node 240 to a terminal under the RPR node 140 to be described after that relates to the case where the FDB 540 performs the MAC address learning.

It is assumed that, at the time point when the frame transfer from a terminal under the RPR node 140 to a terminal under the RPR node 240 is performed, the FDB 540, the interlink connection node group table 590, and the address mapping table 600 are in states described below.

It is assumed that no information is registered in the FDBs 540 in all of the RPR nodes of the RPR networks 10 and 20, that is, the MAC address learning is not performed yet in the FDBs 540 in all of the RPR nodes.

It is assumed that, in each of the interlink connection node group tables 590 of all of the RPR nodes belonging to the RPR network 10, the name "A" of the interlink connection node group, the virtual MAC address "a" of the interlink connection node group, and the MAC addresses of the RPR nodes 100, 110, and 160 belonging to the interlink connection node group are registered so as to be associated with each other.

It is assumed that, in the address mapping table 600 of each of all of the RPR nodes belonging to the RPR network 10, the virtual MAC address "a" of the interlink connection node group and the MAC addresses of the RPR nodes 100, 110, and 160 belonging to the interlink connection node group are registered so as to be associated with each other.

Similarly, it is assumed that, in the interlink connection node group table 590 of each of all of the RPR nodes belonging to the RPR network 20, the name "B" of the interlink connection node group, the virtual MAC address "b" of the interlink connection node group, and the MAC addresses of the RPR nodes 200, 230, and 270 belonging to the interlink connection node group are registered so as to be associated with each other.

It is assumed that, in the address mapping table 600 of each of all of the RPR nodes belonging to the RPR network 20, the virtual MAC address "b" of the interlink connection node group and the MAC addresses of the RPR nodes 200, 230, and 270 belonging to the interlink connection node group are registered so as to be associated with each other.

Transfer of an Ethernet frame from a terminal under the RPR node 140 to a terminal under the RPR node 240 will be described. When the terminal under the RPR node 140 transmits an Ethernet frame to the RPR node 140, the Ethernet frame is supplied to the RPR frame generator 520 via the input port 500-3 of the RPR node 140.

The RPR frame generator 520 of the RPR node 140 searches the FDB 540 using a destination MAC address of the Ethernet frame. In the case where the search succeeds, the RPR frame generator 520 encapsulates the Ethernet frame and generates an RPR frame having the MAC address as the search result as the destination MAC address.

At present, no information is registered in the FDB 540 of the RPR node 140. Therefore, the RPR frame generator 520 of the RPR node 140 fails in the search for the MAC address associated with the destination MAC address of the Ethernet frame.

In the case where the search for the MAC address fails, the RPR frame generator 520 sets an MAC address for broadcast as a destination MAC address, sets an MAC address of its node (RPR node 140) as a transmitter MAC address, and generates an RPR frame in which an Ethernet frame is contained in a payload. The RPR frame generator 520 confirms the MAC address of its node by referring to the MAC address management table 630.

In the case where the destination MAC address of the RPR frame generated by the RPR frame generator 520 is an MAC address for broadcast, the RPR switch processing unit 530 of the RPR node 140 broadcast-transmits the RPR frame.

Concretely, the RPR switch processing unit 530 of the RPR node 140 stores the number of RPR nodes belonging to the RPR network 10 in a TTL field of an RPR frame and transmits the RPR frame from the output port 530-1 or 580-2.

Alternatively, the RPR switch processing unit 530 may store the value of the half of the number of nodes belonging to the RPR network 10 in the TTL field in the RPR frame and transmit the RPR frame from both of the output ports 580-1 and 580-2.

The case where the RPR switch processing unit 530 of the RPR node 140 transmits the RPR frame in which the number of nodes is set from the output port 580-2 connected to the neighboring RPR node 130 by the former method will be described as an example.

The neighboring RPR node 130 receives the RPR frame from the RPR node 140 through the input port 500-1 and supplies it to the frame analyzer 510-1.

The frame analyzer 510-1 of the RPR node 130 determines whether the received RPR frame is a special RPR frame or not in the address mapping table managing unit 590. In the case of "NO", the frame analyzer 510-1 supplies it to the RPR switch processing unit 530. On the other hand, if the received frame is a special RPR frame, the frame analyzer 510-1 supplies it to the address mapping table managing unit 610. The RPR frame input to the frame analyzer 510-1 in the embodiment is an RPR frame obtained by encapsulating an Ethernet frame, but is not a special RPR frame. Therefore, in the embodiment, the input RPR frame is supplied to the RPR switch processing unit 530.

When the supplied frame, that is, the RPR frame in which the MAC address for broadcast is set as the destination MAC address is received, the RPR switch processing unit 530 operates as follows.

The RPR switch processing unit 530 in the RPR node 130 determines whether the transmitter MAC address of the RPR frame is the MAC address of the node of the unit 530 or not by referring to the MAC address management table 630. As a result, in the case where the transmitter MAC address is the MAC address of the node of the unit 530, the RPR frame is discarded in order to prevent occurrence of a broadcast storm caused by formation of a loop. In the embodiment, the transmitter MAC address of the RPR frame is the MAC address of the RPR node 140, so that the discarding process is not performed.

In the case where the transmitter MAC address of the RPR frame is not the MAC address of the node of the unit 530, the RPR switch processing unit 530 subtracts "1" from the value of the TTL of the RPR frame. If the value of the TTL after the subtraction is not "0", the RPR switch processing unit 530 sends the RPR frame to the next RPR node. If the value of the TTL after the subtraction is "0", the RPR switch processing unit 530 discards the RPR frame. At the present time, even if the RPR switch processing unit 530 of the RPR node 130 subtracts "1" from the value of the TTL which is set in the RPR node 140, the resultant value does not become "0". Therefore, the RPR switch processing unit 530 in the RPR node 130 transmits the RPR frame from the output port 580-2 of the node 130 to the RPR node 120.

On the other hand, in the case where the destination MAC address of the RPR frame is the MAC address for broadcast, the RPR switch processing unit 530 in the RPR node 130 supplies a copy of the RPR frame to the Ethernet frame extracting unit 570.

The Ethernet frame extracting unit 570 requests the FDB managing unit 550 to register the corresponding relation between the MAC address of the transmitter of the Ethernet frame contained in the payload of the supplied RPR frame (the MAC address of the terminal under the RPR node 140) and the MAC address of the transmitter of the RPR frame (the MAC address of the RPR node 140) in the FDB 540. The Ethernet frame extracting unit 570 extracts the Ethernet frame contained in the payload of the RPR frame and transmits it to the terminal under the node of the unit 570 from the output port 580-3 of its node. As a result, the Ethernet frame of the broadcast communication is transmitted, first, to the terminal under the RPR node 130.

The FDB managing unit 550 in the RPR node 130 registers the corresponding relation of the MAC address into the FDB 540 in accordance with a request from the Ethernet frame extracting unit 570. In the embodiment, the corresponding relation between the MAC address of the terminal under the RPR node 140 and the MAC address of the RPR node 140 is registered in the FDB 540.

If the corresponding relation requested from the Ethernet frame extracting unit 570 has already been registered in the FDB 540, the FDB managing unit 550 may ignore the request from the Ethernet frame extracting unit 570 or overwrite the already registered information.

After that, the RPR nodes 120, 170, and 150 which belong to the RPR network 10 and are not interlink connection nodes operate in a manner similar to the RPR node 130. Each of the RPR nodes 120, 170, and 150 transfers the RPR frame to the next RPR node and transmits the Ethernet frame in the RPR frame to the terminal under the node itself.

The RPR frame which is broadcast-transmitted from the RPR node 140 is transferred to the RPR node 110 as an interlink connection node via the RPR nodes 130 and 120.

Next, the operation of transferring an RPR frame which is broadcast-transmitted by the RPR nodes 100, 110, and 160 as interlink connection nodes of the RPR network 10 will be described. The case where the RPR node 110 receives an RPR frame transferred from the RPR node 120 will be described here as an example. The operation of the RPR nodes 100 and 160 is similar to that of the RPR node 110.

A basic operation of transferring an RPR frame, of the RPR node 110 is similar to that of the RPR node 130. The RPR frame broadcast-transmitted from the RPR node 140 is transferred in order of the RPR nodes 130, 120, 110, 100, 170, 160, and 150 in the counterclockwise direction in FIG. 1 and the value of the TTL becomes "0" in the RPR node 150. Therefore, the RPR frame is discarded by the RPR switch processing unit 530 in the RPR node 150.

The operation of the RPR node 110, of transferring an RPR frame to a terminal under the RPR node 110 itself is different from that of the RPR node 130. The terminal under the RPR node 110 refers to the interlink connection node 270 belonging to the RPR network 20. When the broadcast-transmitted RPR frame is received, the RPR node 110 determines whether an Ethernet frame in the RPR frame is transmitted to the interlink connection node 270 or not in accordance with a predetermined condition.

With reference to the flowchart shown in FIG. 9, the operation of the RPR node 110 of transmitting the Ethernet frame to the terminal (270) under the RPR node 110 will be described. The RPR switch processing unit 530 in the RPR node 110 determines whether the Ethernet frame contained in the transferred RPR frame is transmitted from the output port 580-3 or not, that is, whether the Ethernet frame is transmitted to the interlink connection node 270 or not in accordance with an algorithm which will be described later (step S1).

When the RPR node 110 determines that the Ethernet frame is transmitted from the output port 580-3 (Yes in step S1), the RPR switch processing unit 530 supplies the RPR frame to the Ethernet frame extracting unit 570 (step S2). The Ethernet frame extracting unit 570 extracts the Ethernet frame from the RPR frame and instructs the FDB managing unit 550 to register the corresponding relation between the MAC address of the transmitter of the Ethernet frame and the MAC address of the transmitter of the RPR frame to the FDB 540 (step S3). The Ethernet frame extracting unit 570 transmits the extracted Ethernet frame from the output port 580-3 of its node to the interlink connection node 270 (step S4).

On the other hand, in the case where it is determined that the Ethernet frame is not transmitted from the output port 580-3 of the RPR node 110 (No in step S1), the RPR switch processing unit 530 does not supply the RPR frame to the Ethernet frame extracting unit 570 and does not perform the MAC address learning. The MAC address learning may be performed but the Ethernet frame is not transmitted to the terminal under the RPR node 110.

Even in the case where the Ethernet frame is not transmitted to the terminal under the RPR node 110, the RPR frame is transferred to the next hop by an operation similar to that of the RPR node 130.

As an algorithm related to determination of whether an Ethernet frame is transmitted to the interlink connection node 270 or not, an algorithm of controlling so that the Ethernet frame is transmitted from any one of interlink connection nodes belonging to the same interlink connection node group is employed. As described above, an RPR frame is transferred in the RPR network 10, so that the Ethernet frame included in the RPR frame is delivered to a plurality of interlink connection nodes. However, when each of the plurality of interlink connection nodes sends the Ethernet frame, a plurality of Ethernet frames to the same destination are sent to the RPR network 20. As a result, the same Ethernet frames are delivered to the destination terminal a plurality of times. Therefore, in the case where a broadcast-transmitted Ethernet frame is transmitted from the RPR network 10 to the RPR network 20, the Ethernet frame is transmitted from any one of the interlink connection nodes (100, 110, and 160).

As such an algorithm, for example, an algorithm of using information of the header and/or the payload of a frame as a parameter and determining whether an Ethernet frame is transmitted to a terminal under an RPR node or not in accordance with the parameter is used. Alternatively, an algorithm of determining whether an Ethernet frame is transmitted to a terminal under an RPR node or not in accordance with a result of predetermined calculation executed by using the parameter may be employed. The frame may be an RPR frame or an Ethernet frame encapsulated in an RPR frame.

Examples of parameters used in the algorithm as described above are the MAC address of a destination of an Ethernet frame, a transmitter MAC address, priority, VLAN ID, an Ether type, a destination IP address of an IP packet contained in the payload of a frame, a transmitter IP address and, further, a destination TCP port number, a transmitter TCP port number, and the like of a TCP packet contained in the IP packet. The parameters are just examples, and the other information included in a frame may be used as parameters.

As a concrete example, it is sufficient to determine different parameter values each indicating that an Ethernet frame is transmitted for RPR nodes (100, 110, and 160) belonging to an interlink connection node group. When the parameter value of a received frame corresponds to the determined parameter value, it is determined that an Ethernet frame is transmitted to a terminal under the RPR node. For example, as an Ethernet frame to be transmitted to a terminal under the RPR node 100, in an algorithm applied to the RPR node 100, Ethernet frames having VLAN_ID of 1 to 1000 are set. In an algorithm for the RPR node 110, Ethernet frames having VLAN_ID of 1001 to 2000 are set. For the RPR node 160, Ethernet frames having VLAN_ID other than 1 to 2000 are set. The RPR nodes 100, 110, and 160 as interlink connection nodes make determinations according to the algorithms, thereby enabling the Ethernet frame to the same destination from being transmitted from the plurality of nodes. In addition, the traffic of the Ethernet frames can be dispersed to the interlinks 420 to 440.

When any of the interlink connection nodes becomes unable to transmit an Ethernet frame to a terminal under the node due to occurrence of trouble, other interlink connection node may take over the value of the parameter determined for the interlink connection node. For example, an interlink connection node which becomes unable to transmit an Ethernet frame to a terminal under the node transmits a special RPR frame for instructing the value of the parameter determined to the node to the other Ethernet frame, and the interlink connection node which receives the special RPR frame sets the parameter value in its node.

As other example, only one of interlink connection nodes belonging to an interlink connection node group may transmit an Ethernet frame to a terminal under the node. In this case, each of the interlink connection nodes preliminarily registers information of whether an Ethernet frame is to be transmitted to a terminal under the node itself or not. When a broadcast-transmitted RPR frame is received, each of the interlink connection nodes determines whether the Ethernet frame can be transmitted or not on the basis of the pre-registered information. When trouble occurs in an interlink connection node to transmits an Ethernet frame to a terminal under the node, the special RPR frame for instructing transmission of the Ethernet frame to a terminal under a node is transmitted to the other interlink connection node. After that, the other interlink connection node transmits the Ethernet frame to the terminal under the node. For example, in the case where the interlink connection node to transmit the Ethernet frame to a terminal under the node is the RPR node 100, when trouble occurs in the interlink 420, the RPR node 100 may be replaced with the RPR node 110 as the neighboring interlink connection node. In this case, when trouble in the interlink 420 is detected, the RPR node 100 transmits the special RPR frame for instructing transmission of the Ethernet frame in the RPR frame to the terminal under the node to the RPR node 110. The RPR node 110 which receives the special RPR frame transmits the Ethernet frame to the terminal (200) under the RPR node 110 when the broadcast-transmitted RPR frame is received.

As described above, any one of the RPR nodes 100, 110, and 160 extracts an Ethernet frame from a broadcast-transmitted RPR frame and transfer the Ethernet frame to the RPR network 20 via any of the interlinks 420, 430, and 440. In the following, operation of transferring the Ethernet frame transferred from the RPR network 10 to the RPR network 20 to a terminal under the RPR node 240 will be described. The case where the RPR node 110 transfers an Ethernet frame contained in an RPR frame to the RPR node 270 via the interlink 430 will be described as an example.

When the Ethernet frame from the RPR node 110 is received by the input port 500-3, the RPR node 270 supplies the Ethernet frame to the RPR frame generator 520.

The RPR frame generator 520 searches the FDB 540 using the destination MAC address of the Ethernet frame as a key and reads the MAC address associated with the destination MAC address of the Ethernet frame. If the search succeeds, by encapsulating the Ethernet frame and setting the read MAC address as a destination MAC address, an RPR frame is generated.

At present time point, no information is registered in the FDB 540 in the RPR node 270, so that the RPR frame generator 520 in the RPR node 270 fails the search.

Since acquisition of an MAC address fails, the RPR frame generator 520 in the RPR node 270 sets the MAC address for broadcast as the destination MAC address, sets an MAC address "b" assigned to an interlink connection node group "B" to which the RPR node 270 belongs as the transmitter MAC address, and makes the Ethernet frame contain in the payload, thereby generating an RPR frame. The RPR frame generator 520 refers to the address mapping table 600 and uses a virtual MAC address "b" associated with the MAC address of the node as a transmitter MAC address. The RPR frame generator 520 supplies the generated RPR frame to the RPR switch processing unit 530.

With respect to setting of the transmitter MAC address, in the RPR node 140, the MAC address of the node itself is set. In the RPR node 270, the virtual MAC address ("b") of the interlink connection node group to which the node itself belongs is set as the transmitter MAC address for the following reason. The RPR node 140 is a node which does not belong to the interlink connection node group whereas the RPR node 270 is a node belonging to the interlink connection node group. At the time of generation of an RPR frame, the RPR frame generator 520 determines whether the MAC address of a node is registered in the address mapping table 600 or not, thereby determining whether the node belongs to the interlink connection node group or not.

In the case where the destination MAC address of an RPR frame to be transmitted is the MAC address for broadcast, the RPR switch processing unit 530 in the RPR node 270 broadcast-transmits the RPR frame. The operation is similar to the broadcast transmission performed by the RPR switch processing unit 530 in the RPR node 140 described above.

The operation of each of the RPR nodes belonging to the RPR network 20, for transferring the RPR frame which is broadcast-transmitted by the RPR node 270 will be described. In the following, the case of an RPR node belonging to the interlink connection node group "B" and the case of an RPR node which does not belong to the group will be described separately.

An RPR node belonging to the interlink connection node group "B" operates as follows on receipt of an RPR frame which is broadcast-transmitted to the RPR network 20 from other RPR node belonging to the group as the transmitter. The RPR frame received refers to an RPR frame in which the virtual MAC address "b" of the group "B" is set as a transmitter MAC address and the MAC address for broadcast is set as a destination MAC address. The frame analyzer 510-1 (or the frame analyzer 510-2) supplies the input RPR frame to the RPR switch processing unit 530. The RPR switch processing unit 530 subtracts "1" from the value of the TTL stored in the RPR frame. If the value of the TTL after the subtraction is not "0" the RPR switch processing unit 530 sends the RPR frame to the next RPR node. The next node is an RPR node connected on the side opposite to the port that has received the RPR frame. On the other hand, if the value of the TTL after the subtraction is "0", the RPR switch processing unit 530 discards the RPR frame and does not output it to the Ethernet frame extracting unit 570. Therefore, the Ethernet frame in the RPR frame transmitted to the RPR node in the interlink connection node group "B" is not transmitted to a terminal under the node. The corresponding relation between the virtual MAC address ("b") set as the MAC address of the transmitter of the RPR frame and the MAC address of the transmitter of the Ethernet frame in the RPR frame (the MAC address of the terminal under the RPR node 140) is not registered in the FDB 540.

By such operation of an RPR node belonging to the interlink connection node group "B", an Ethernet frame transferred to the RPR network 20 can be prevented from being transferred again to the RPR network 10. Therefore, the network can be avoided from becoming unstable due to a broadcast storm.

The operation of an RPR node which does not belong to the interlink connection node group "B", of transferring an RPR frame which is broadcast-transmitted from an RPR node as a transmitter belonging to the group "B" to the RPR network 20 is basically similar to that of the RPR node 130 in the RPR network 10 described above. In the case of the interlink connection node group "B", however the virtual MAC address ("b") of the interlink connection node group "B" is set as the transmitter MAC address of an RPR frame which is broadcast-transmitted. Therefore, at the time of registering a corresponding relation of an MAC address in the FDB 540, the EDB managing unit 550 of a node in the interlink connection node group "B" registers the corresponding relation between the virtual MAC address ("b") and the MAC address of a terminal (terminal under the RPR node 140). As described above, the case of the group "B" is different from that of the interlink connection node group "A" with respect to the point that the corresponding relation between the virtual MAC address and the MAC address of the terminal is registered.

By the transfer operation by each of the RPR nodes belonging to the RPR network 20, the RPR node 240 receives the RPR frame which is broadcast transmitted. The RPR node 240 transmits the Ethernet frame contained in the RPR frame to the terminal under the node itself. As a result, the Ethernet frame transmitted from the terminal under the RPR node 140 in the RPR network 10 is transferred to the terminal under the RPR node 240 in the RPR network 20.

In the following, on precondition that the Ethernet frame is transferred from the terminal under the RPR node 140 to the terminal under the RPR node 240, the operation in the case of transferring (sending back) the Ethernet frame from the terminal under the RPR node 240 to the terminal under the RPR node 140 will be described.

By the transferring operation, at present, the corresponding relation between the MAC address of the terminal under the RPR node 140 and the MAC address of the RPR node 140 is registered in the FDB 540 in each of all of the RPR nodes belonging to the RPR network 10. In the FDB 540 of an RPR node which belongs to the RPR network 20 and is not an interlink connection node, the corresponding relation between the MAC address of the terminal under the RPR node 140 and the virtual MAC address "b" of the interlink connection node group "B" is registered.

FIG. 10 shows the procedure of the RPR node 240 which has received an Ethernet frame whose destination is a terminal under the RPR node 140.

When the terminal under the RPR node 240 transmits the Ethernet frame to the RPR node 240, the input port 500-3 of the RPR node 240 receives the Ethernet frame (step S11).

The RPR frame generator 520 in the RPR node 240 determines the MAC address as the MAC address of the destination of the RPR frame storing the received Ethernet frame (step S12). At the time of determining the address, the frame generator 520 searches the FDB 540 using the MAC address of the destination of the received Ethernet frame as a key, and reads the MAC address associated with the key.

In the case where the RPR frame generator 520 fails in the search, like in the RPR node 140, the MAC address for broadcast is set as a destination MAC address. In the example, the correspondence between the MAC address of the terminal under the RPR node 140 and the virtual MAC address "b" of the interlink connection node group "B" is already stored in the FDB 540. Therefore, the RPR frame generator 520 succeeds in the search, and reads the virtual MAC address "b" of the interlink connection node group "B" from the FDB 540.

The RPR frame generator 520 in the RPR node 240 reads an MAC address associated with the virtual MAC address "b" in the interlink connection node group "B" by referring to the address mapping table 600. In the example, the MAC addresses of the RPR nodes 200, 230, and 270 as the interlink connection nodes of the RPR network 20 are read.

According to an algorithm to be described later, the RPR frame generator 520 selects one of the read MAC addresses and determines it as the MAC address of the destination of the RPR frame.

Next, the RPR frame generator 520 in the RPR node 240 generates an RPR frame by encapsulating the Ethernet frame (step S13). That is, the RPR frame generator 520 sets the determined MAC address as the destination MAC address, sets the MAC address of the node 240 as the transmitter MAC address, and generates an RPR frame in which the Ethernet frame received by the terminal under the node 240 is contained in the payload.

The RPR switch control unit 530 in the RPR node 240 transmits the generated RPR frame from one of the output ports 580-1 and 580-2 (step S14). In the TTL field of the RPR frame, the number of hops from the output port from which the RPR frame is actually output to the RPR node as the destination is stored. Since any one of the MAC addresses of the RPR nodes 200, 230, and 270 is set in the MAC address of the destination of the RPR frame generated, transmission of the RPR frame from the RPR node 240 is unicast transmission.

For example, round robin or weighted round robin can be employed as an algorithm for the RPR frame generator 520 to select one of the MAC addresses corresponding to the virtual MAC address (step S12 in FIG. 10).

For example, the header and/or the payload of the Ethernet frame are/is used as a parameter. According to the parameter, one of a plurality of MAC addresses may be selected. Alternatively, an MAC address may be selected according to a result of predetermined calculation executed using the parameter.

For example, as a parameter used in the algorithm as described above, the MAC address of a destination of an Ethernet frame, a transmitter MAC address, priority, VLAN_ID, an Ether type, a destination IP address of an IP packet contained in the payload of a frame, and a transmitter IP address can be applied. Further, a destination TCP port number, a transmitter TCP port number, or the like of a TCP packet stored in the IP packet may be used. The parameters are just examples, and the other information included in a frame may be used as a parameter.

It is assumed that an RPR node which does not belong to an interlink connection node group detects a state where an interlink connection node cannot transfer an Ethernet frame to a terminal under the node. In this case, the RPR node which does not belong to the interlink connection node group changes the corresponding relation between a parameter and an MAC address so that an MAC address determined by the parameter is only an MAC address of an RPR node capable of transferring the Ethernet frame. In the case of employing round robin or weighted round robin, it is sufficient to set, as an MAC address to be selected, only the MAC address of the RPR node capable of transferring the Ethernet frame to the terminal under the node.

In the following, the case where the RPR frame generator 520 in the RPR node 240 selects the MAC address of the RPR node 200 as the destination MAC address will be described as an example.

The RPR frame generator 520 in the RPR node 240 sets an MAC address of the RPR node 200 as a destination MAC address, sets an MAC address of its node as a transmitter MAC address, and generates an RPR frame in which an Ethernet frame is stored in a payload (step S13).

The RPR switch processing unit 530 of the RPR node 240 transmits the generated RPR frame to the neighboring RPR node 250 from either the output port 580-1 or 580-2 (step S14). In the TTL field in the RPR frame, the number of hops from the output port from which the RPR frame is actually output to the RPR node 200 is set. The case where the RPR frame is transmitted from the output port 580-1 will be described as an example.

The RPR node 250 receives the RPR frame from the RPR node 240 through the input port 500-2. The RFR frame received by the input port 500-2 is supplied to the frame analyzer 510-2 in the RPR node 250.

When the input RPR frame is not a special RPR frame used by the address mapping table managing unit 610, the frame analyzer 510-2 in the RPR node 250 supplies it to the RPR switch processing unit 530. If the input frame is a special RPR frame, the frame analyzer 510-2 supplies it to the address mapping table managing unit 610. The RPR frame input to the frame analyzer 510-2 in the embodiment is an RPR frame obtained by encapsulating an Ethernet frame, but is not a special RPR frame. Therefore, the frame analyzer 510-2 supplies the input RPR frame to the RPR switch processing unit 530.

When the RPR frame is supplied, the RPR switch processing unit 530 in the RPR node 250 operates as follows.

In the case where the transmitter MAC address of the RPR frame is the MAC address of the node of the RPR switch processing unit 530, the unit 530 discards the received RPR frame in order to prevent occurrence of a broadcast storm caused by formation of a loop.

The RPR switch processing unit 530 determines whether the RPR frame is an RPR frame whose destination is the node of the unit 530 or not. That is, the RPR switch processing unit 530 determines whether the destination MAC address in the received RPR frame and the MAC address of the node of the unit 530 coincide with each other or not.

When it is determined that the destination of the received RPR frame is not the node (250) of the unit 530, the RPR switch processing unit 530 subtracts "1" from the value of the TTL stored in the RPR frame. If the subtraction result is not "0", the RPR switch processing unit 530 sends the RPR frame to the next RPR node (260) from the output port 580-1. When the result of subtraction of "1" from the TTL is "0,", the RPR switch processing unit 530 discards the RPR frame.

On the other hand, when the destination of the received RPR frame is the node (250) of the unit 530, the RPR switch processing unit 530 supplies the RPR frame to the Ethernet frame extracting unit 570. The Ethernet frame extracting unit 570 requests the FDB managing unit 550 to register the corresponding relation between the MAC address of the transmitter of the Ethernet frame stored in the RPR frame (the MAC address of the terminal under the RPR node 240) and the MAC address of the transmitter of the RPR frame (the MAC address of the RPR node 240) into the FDB 540. The Ethernet frame extracting unit 570 extracts the Ethernet frame from the RPR frame and transmits it to the terminal under the node of the unit 570 from the output port 580-3. The FDB managing unit 550 registers the corresponding relation of the MAC address into the FDB 540 in accordance with a request from the Ethernet frame extracting unit 570.

In the embodiment, the MAC address of the destination in the RPR frame which is unicast-transmitted from the RPR node 240 is the MAC address of the RPR node 200, and does not coincide with the MAC address of the RPR node 250. Therefore, the RPR switch processing unit 530 in the RPR node 250 subtracts "1" from the value of the TTL stored in the RPR frame. Since the subtraction result is not "0", the RPR switch processing unit 530 sends the RPR frame subjected to the TTL subtraction to the next RPR node (260) from the output port 580-1.

The operations of each of the RPR nodes until the RPR frame which is unicast-transmitted from the RPR node 240 is transferred to the RPR node 200 are similar to those of the RPR node 250.

When the RPR frame is input to the frame analyzer 510-2 via the input port 500-2 in the RPR node 200, the frame analyzer 510-2 in the RPR node 200 supplies the RPR frame to the RPR switch processing unit 530. Since the destination MAC address of the received RPR frame and the MAC address of the node of the unit 530 coincide with each other, the RPR switch processing unit 530 supplies the RPR frame to the Ethernet frame extracting unit 570. The Ethernet frame extracting unit 570 requests the FDB managing unit 550 to register the corresponding relation between the MAC address of the transmitter of the Ethernet frame in the RPR frame and the MAC address of the transmitter of the RPR frame into the FDB 540. The Ethernet frame extracting unit 570 extracts the Ethernet frame stored in the RPR frame and transmits it to the terminal under the node of the unit 570 from the output port 580-3. The terminal under the RPR node 200 is the RPR node 100 in the RPR network 10. The FDB managing unit 550 in the RPR node 200 registers the corresponding relation of the MAC addresses in to the FDB 540 of the node 200 in accordance with a request of the Ethernet frame extracting unit 570. As a result, the Ethernet frame transmitted from the RPR node 240 is received by the RPR node 100.

The operations performed until the Ethernet frame transmitted from the RPR node 240 is received by the RPR node 100 are not limited to the above-described operations but may be operations as described below.

The terminal under the RPR node 240 transmits the Ethernet frame whose destination is a terminal under the RPR node 140 to the RPR node 240. The Ethernet frame is input to the RPR frame generator 520 in the RPR node 240 via the input port 500-3. The RPR frame generator 520 in the RPR node 240 searches the FDB 540 using, as a key, the MAC address of the destination of the Ethernet frame received from the terminal under the node 140 (the MAC address of the terminal under the RPR node 140). In the FDB 540, the MAC address of the terminal under the RPR node 140 and the virtual MAC address "b" of the interlink connection node group "B" are associated with each other. Therefore, the RPR frame generator 520 in the RPR node 240 reads the virtual MAC address "b" as a result of the search from the FDB 540.

The RPR frame generator 520 in the RPR node 240 sets the virtual MAC address "b" as a search result as the destination MAC address, sets the MAC address of the node 240 as the transmitter MAC address, and generates an RPR frame in which the Ethernet frame received from the terminal under the node 240 is contained in the payload.

The RPR switch processing unit 530 in the RPR node 240 stores the maximum value of the number of hops from the node (240) of itself to each of the interlink connection nodes into the TTL field in the generated RPR frame. The RPR switch processing unit 530 in the RPR node 240 transmits the RPR frame from either the output port 580-1 or 580-2 of the node of itself. In this case, as the destination address of the RPR frame, the virtual MAC address assigned to the interlink connection node group is stored. Therefore, in the operation, transmission of the RPR frame from the RPR node 240 is multicast transmission whose destination is the interlink connection node of the group. In the TTL field, in place of the maximum value of the number of hops from the node 240 to the interlink connection node, the number of nodes in the RPR network 20 to which the node 240 itself belongs may be set.

Next, the case where the RPR switch processing unit 530 in the RPR node 240 transmits an RPR frame to an RPR node from the output port 580-1 will be described.

The operation of any of the RPR nodes which do not belong to the interlink connection node group is similar to that of the RPR node 250. Therefore, the RPR frame transmitted from the output port 580-1 of the RPR node 240 is transferred to the RPR node 270 via the RPR nodes 250 and 260. The RPR frame is input to the frame analyzer 510-2 in the RPR node 270 via the input port 500-2.

If the RPR frame is not a special RPR frame, the frame analyzer 510-2 in the RPR node 270 supplies the RPR frame to the RPR switch processing unit 530. In the embodiment, the RPR frame input to the frame analyzer 510-2 is an RPR frame obtained by encapsulating the Ethernet frame and is not a special RPR frame. Consequently, the frame analyzer 510-2 supplies the RPR frame to the RPR switch processing unit 530. In the case where the RPR frame is a special RPR frame, as already described, the special RPR frame is supplied to the address mapping table managing unit 610.

In the case where the MAC address of the transmitter of the RPR frame is the MAC address of the node of the unit 530, the RPR switch processing unit 530 in the RPR node 270 belonging to the interlink connection node group discards the received RPR frame in order to prevent occurrence of a broadcast storm due to formation of a loop. The operation is similar to that of an RPR node which does not belong to the interlink connection node group.

In the case where the MAC address of the destination of the RPR frame is not the virtual MAC address of the interlink connection node group to which the node 270 belongs, the RPR switch processing unit 530 in the RPR node 270 subtracts "1" from the value of the TTL in the RPR frame. If the value of the TTL after the subtraction is not "0", the RPR switch processing unit 530 sends the RPR frame to the next RPR node. If the value of the TTL after the subtraction is "0", the RPR switch processing unit 530 discards the RPR frame.

Any one of the interlink connection nodes transmits the Ethernet frame in the multicast-transmitted RPR frame to a terminal under the node, that is, an RPR node belonging to the other RPR network. FIG. 11 is a flowchart showing the case where an interlink connection node belonging to an interlink connection node group receives a multicast-transmitted RPR frame. The case where the RPR node 270 is an interlink connection node will be described as an example.

In the case where the MAC address of the destination of the RPR frame which is multicast-transmitted is the virtual MAC address ("b") of the interlink connection node group to which the node 270 belongs, the RPR switch processing unit 530 in the RPR node 270 determines whether or not the Ethernet frame in the RPR frame is transmitted from the output port 580-3 in accordance with an algorithm which will be described later (step S21).

In the case where it is determined that the Ethernet frame is transmitted from the output port 580-3 of the RPR node 270 to a terminal under command (RPR node 110) (YES in step S21), the RPR switch processing unit 530 of the RPR node 270 supplies the RPR frame to the Ethernet frame extracting unit 570 (step S22). The Ethernet frame extracting unit 570 which has received the RPR frame requests the FDB managing unit 550 to register the corresponding relation between the MAC address of the transmitter of the Ethernet frame stored in the RPR frame and the MAC address of the transmitter of the RPR frame into the FDB 540. The FDB managing unit 550 registers the corresponding relation of the addresses into the FDB 540. The Ethernet frame extracting unit 570 extracts the Ethernet frame from the RPR frame (step S23) and transmits the Ethernet frame from the output port 580-3 to a terminal under the node of the unit 570.

In the case where it is determined that the Ethernet frame is not transmitted from the output port 580-3 of the RPR node 270 to a terminal under command (the RPR node 110) (NO in step S21), the RPR switch processing unit 530 in the RPR node 270 subtracts "1" from the value of the TTl stored in the RPR frame (step S25). If the value of the TTL after subtraction is not "0" (YES in step S26), the RPR frame is transmitted from the output port 580-1 to the next RPR node (200) (step S27). On the other hand, when the value of the TTL after subtraction is "0", the RPR switch processing unit 530 discards the RPR frame (step S28).

Although the operation of the interlink connection node 270 has been described, the operation performed in the case where a multicast-transmitted RPR frame is received by other interlink connection node (200 or 220) is similar to the above.

As an algorithm of determining whether the Ethernet frame in the multicast-transmitted RPR frame is transmitted to a terminal under command or not, an algorithm of determining that only one of RFR nodes belonging to the same interlink connection node group transmits an Ethernet frame to a terminal under command is employed.

As such an algorithm, for example, an algorithm of using information of the header and/or the payload of a frame as a parameter and determining whether an Ethernet frame is transmitted to a terminal under command or not in accordance with the parameter can be used. Alternatively, an algorithm of determining whether an Ethernet frame is transmitted to a terminal under command or not in accordance with a result of predetermined calculation executed by using the parameter may be employed. The frame may be an RPR frame or an Ethernet frame encapsulated in an RPR frame.

Examples of parameters which can be used in the algorithm are the MAC address of a destination of an Ethernet frame, a transmitter MAC address, priority, VLAN_ID, an Ether type, a destination IP address of an IP packet contained in the payload of a frame, and a transmitter IP address. Further, a destination TCP port number, a transmitter TCP port number, and the like of a TCP packet stored in the IP packet may be used. The parameters are just examples, and the other information included in a frame may be used as parameters.

As a concrete example, it is sufficient to determine different parameter values each indicating that an Ethernet frame is transmitted to a terminal under command, for RPR nodes belonging to an interlink connection node group. When the parameter value of a received frame corresponds to the determined parameter value, it is determined that an Ethernet frame is transmitted to a terminal under command. For example, in the case where VLAN_ID of the Ethernet frame is set as a parameter value, VLAN_ID of 1 to 1000 are assigned to the RPR node 200, VLAN_ID of 1001 to 2000 are assigned to the RPR node 270, and VLAN_ID other than 1 to 2000 are set for the RPR node 230. When each of the RPR nodes 200, 270, and 230 determines whether an Ethernet frame is transmitted to a terminal under command according to the algorithm or not, traffic can be dispersed and transferred to the interlinks 420 to 440 without overlapping transfer.

When any of the interlink connection nodes becomes unable to transmit an Ethernet frame to a terminal under command due to occurrence of trouble, other interlink connection node may take over the value of the parameter determined for the interlink connection node. For example, an interlink connection node which becomes unable to transmit an Ethernet frame to a terminal under command transmits a special RPR frame for notifying other node of a parameter value determined for the node itself, and the interlink connection node which receives the special RPR frame sets the parameter value in the node itself.

As other example, only one of interlink connection nodes belonging to an interlink connection node group may transmit an Ethernet frame to a terminal under command. In this case, each of the interlink connection nodes pre-stores information of whether or not an Ethernet frame is determined to be transmitted to a terminal under command. When a multicast-transmitted RPR frame is received, each of the interlink connection nodes determines whether the node itself is set as an interlink connection node for transmitting an Ethernet frame or not. When trouble occurs in an interlink connection node to transmit an Ethernet frame to a terminal under command, the special RPR frame is transmitted to the other interlink connection node. Only the interlink connection node which receives the special RPR frame takes over transmission of the Ethernet frame to the terminal under command. For example, it is set that only the RPR node 200 transmits an Ethernet frame to a terminal under command. In the case where trouble such as disconnection of the interlink 420 occurs, the RPR node 270 takes over the Ethernet frame transmitting process from the RPR node 200. At this time, when the failure in the interlink 420 is detected, the RPR node 200 transmits the special RPR frame for instructing transmission of the Ethernet frame in the received RPR frame to the terminal under command to the RPR node 270. The RPR node 270 which receives the special RPR frame transmits the Ethernet frame to the terminal under command when the multicast-transmitted RPR frame is received by the node itself.

In the case where the RPR node 240 generates an RPR frame by encapsulating an Ethernet frame and transmits it, unicast transmission may be performed by setting the MAC address of any one of RPR nodes belonging to the interlink connection node group "B" as the destination MAC address of the RPR frame. Alternatively, multicast transmission may be performed by using the virtual MAC address "b" of the interlink connection node group "B" as the MAC address of the destination of the RPR frame. In any of the cases, an Ethernet frame can be transferred to any one of the RPR nodes belonging to the interlink connection node group "A" via any one of the interlinks 420, 430, and 440.

Next, the operations performed since an Ethernet frame is transferred from the RPR network 20 to the RPR network 10 until the Ethernet frame is transferred to a terminal under the RPR node 140 will be described. The case where the RPR node 200 transfers the Ethernet frame stored in the RPR frame to the RPR node 100 via the interlink 420 will be described as an example.

The RPR node 100 receives the Ethernet frame transmitted from the RPR node 200 by the input port 500-3 and supplies it to the RPR frame generator 520.

The RPR frame generator 520 in the RPR node 100 searches the FDB 540 using the MAC address of the destination of the Ethernet frame as a key, and reads the MAC address corresponding to the key. In the case where the search fails, the RPR frame generator 520 generates an RPR frame in which the MAC address for broadcast is set as the destination MAC address. On the other hand, in the case where the search succeeds, the RPR frame generator 520 generates an RPR frame in which the MAC address read from the FDB 540 is stored as a destination MAC address. In the example, in the FDB 540 in the RPR node 100, the MAC address of a terminal as the destination of an Ethernet frame and the MAC address of the RPR node 140 under which the terminal is accommodated are stored so as to be associated with each other. Therefore, the RPR frame generator 520 in the RPR node 100 succeeds in the search for the FDB 540 and, as a result, the MAC address of the RPR node 140 is read from the FDB 540.

The RPR frame generator 520 in the RPR node 100 sets the MAC address of the RPR node 140 as the destination MAC address, sets the MAC address "a" of the interlink connection node group "A" to which the node belongs as the transmitter MAC address, and generates an RPR frame in which the Ethernet frame received from the RPR node 200 is contained in the payload. In the address mapping table 600, the MAC address corresponding to the MAC address "a" of the interlink connection node group includes the address of the node (100) of the table. Therefore, the RPR frame generator 520 determines that its node belongs to the interlink connection node group and uses the virtual address "a" of the interlink connection node group as a transmitter MAC address. The RPR frame generator 520 supplies the generated RPR frame to the RPR switch processing unit 530.

The RPR switch processing unit 530 in the RPR node 100 transmits the RPR frame from the output port 580-1 or 580-2. In the TTL field in the RPR frame, the number of hops from the port for actually outputting the RPR frame, which is either the output port 580-1 or 580-2 of the RPR node 100, to the RPR node 140 is stored. The transmission is unicast transmission.

The case where the RPR switch processing unit 530 in the RPR node 100 stores the number of hops from its node to the RPR node 140 in the TTL field in the RPR frame and transmits the RPR frame from the output port 580-2 to the RPR node 170 will be described as an example.

The RPR frame which is unicast-transmitted from the RPR node 100 is sequentially transferred to the RPR nod 140 via the RPR nodes 170, 160, and 150. The RPR node 140 receives an RPR frame whose destination is the node itself, extracts an Ethernet frame from the RPR frame, and transmits the Ethernet frame to a terminal under the node itself. The operations of the RPR nodes 170, 160, and 150 at this time are similar to those of the RPR node 250 for transferring the RPR frame which is unicast-transmitted from the RPR node 240. The operation of the RPR node 140 for transmitting the Ethernet frame to a terminal under command is similar to the operation of the RPR node 200 for receiving an RPR frame which is unicast-transmitted and transmitting the RPR frame to the RPR node 100 as a terminal under command.

The terminal under the RPR node 140 receives the Ethernet frame transmitted from the RPR node 140 through the output port 580-3. The transmitter of the Ethernet frame is the terminal under the RPR node 240.

In the embodiment, the plurality of interlinks (420, 430, and 440) are provided between the RPR network 10 and the RPR network 20, so that a high-reliability communication system can be realized. In the case of transferring Ethernet frames among the RPR networks, by transferring the Ethernet frames so as to be spread to the plurality of interlinks, occurrence of congestion can be suppressed.

By registering the corresponding relation between the MAC address of an RPR node and the virtual MAC address of an interlink connection node group in the interlink connection node group table 590 and registering the corresponding relation in the address mapping table 600, the RPR nodes can be grouped as an interlink connection node group. Therefore, an arbitrary node on the network can be made operate as an interlink connection node. Thus, a plurality of interlinks can be disposed without limitation of positions of station facilities, link laying places, and the like.

Next, trouble recovering operation performed when trouble such as disconnection occurs in the interlinks 420, 430, and 440 between the RPR networks 10 and 20 will be described. The case where trouble occurs in the interlink 420 and recovery from the failure is performed so that communication between the RPR networks only via the interlinks 430 and 440 will be described.

FIG. 12 is a flowchart showing an example of the operations of an RPR node belonging to the RPR network 10 in the case where trouble occurs in the interlink 420. When trouble occurs in the interlink 420, the port state monitoring unit 620 in the RPR node 100 detects that the port P3 of the node 100 (the input port 500-3 or the output port 500-3) became invalid (step S41). The port state monitoring unit 620 notifies the address mapping table managing unit 610 in the node of itself of the fact that the port P3 became invalid.

Similarly, the port state monitoring unit 620 in the RPR node 200 also detects that the port P3 of the node of itself became invalid and notifies the address mapping table managing unit 610 of the fact. The operations of the RPR node 200 and the other RPR nodes belonging to the RPR network 20 are similar to those of the RPR node 100 and the other RPR nodes belonging to the RPR network 10. In the following, with reference to FIG. 12, the operations of the RPR node 100 and the other RPR nodes belonging to the RPR network 10 will be described. The operations of the RPR node 200 and the other RPR nodes belonging to the RPR network 20 will not be described.

When it is notified that the port P3 became invalid, the address mapping table managing unit 610 in the RPR node 100 determines whether or not the node of itself belongs to the group with reference to the interlink connection node group table 590. The address mapping table managing unit 610 determines whether the MAC address of the node of itself is included in MAC addresses associated with identifiers (virtual MAC addresses) of interlink connection node groups or not. If included, the address mapping table managing unit 610 determines that the node of itself belongs to the interlink connection node group. In the case where the node of itself belongs to the interlink connection node group, the address mapping table managing unit 610 deletes the MAC address of the node of itself from the address mapping table 600 (step S42).

Further, to all of the RPR nodes belonging to the RPR network 10, the address mapping table managing unit 610 in the RPR node 100 broadcast-transmits an instruction to delete the MAC address of the RPR node 100 from the entry of the interlink connection node group of the RPR node 100 in entries in the address mapping table 600 of the RPR nodes (step S43). The broadcast transmission is performed by the RPR switch processing unit 530.

As the notifying process, for example, the address mapping table managing unit 610 sets a special MAC address dedicated to notify deletion as the destination MAC address, sets the MAC address of the node (100) of itself as the transmitter MAC address, and generates a special RPR frame in which the virtual MAC address of the interlink connection node group to which the node of itself belongs is contained in the payload. The RPR switch processing unit 530 broadcast-transmits the special RPR frame. In the following, the special RPR frame will be described as a special RPR frame for notification of deletion. The broadcast transmission is defined in, for example, "IEEE Standards 802.17". The special RPR frame for notification of deletion may be generated by the RPR switch processing unit 530 which broadcast-transmits the frame.

The special RPR frame for notification of deletion received by the input port 500-1 or 500-2 of any of the RPR nodes 110 to 170 is supplied to the frame analyzer 510-1 or 510-2 in the RPR node. The frame analyzer 510-1 or 510-2 supplies the input special RPR frame for notification of deletion to the address mapping table managing unit 610.

The address mapping table managing unit 610 deletes the transmitter MAC address (in the example, the MAC address of the RPR node 100) which is set in the special RPR frame for notification of deletion from the entry of the interlink connection node group to which the RPR node 100 belongs in the address mapping table 600 (step S44).

The address mapping table 610 in each of the RPR nodes transmits the received special RPR frame for notification of deletion to the next RPR node by the RPR switch processing unit 530 (step S45). The mode of discarding the special RPR frame for notification of deletion is similar to that of the other RPR frames which are broadcast-transmitted.

As a result, the MAC address of the RPR node 100 whose port P3 corresponding to the interlink 420 became invalid is deleted from the address mapping table 600 of each of the RPR nodes belonging to the RPR network 10. Processes similar to the above are performed in the RPR network 20, thereby deleting the MAC address of the RPR node 200 whose port P3 corresponding to the interlink 420 became invalid from the address mapping table 600 of each of the RPR nodes belonging to the RPR network 20.

It is now assumed that each of the interlink connection nodes determines whether an Ethernet frame is transmitted to a terminal under command or not in accordance with the parameter of a received RPR frame. In this case, the interlink connection node whose port P3 became invalid notifies any of the interlink connection nodes belonging to the interlink connection node group to which the node itself belongs of an instruction of taking over the value of the parameter determined in the node itself. The notification may be given by the special RPR frame. On reception of an RPR frame matching the parameter value, the address mapping table managing unit 610 of the interlink connection node taking over the parameter value requests the RPR switch processing unit 530 to send the Ethernet frame to a terminal under command. In such a manner, the transmission of the Ethernet frame performed by the interlink connection node whose port P3 became invalid can be taken over by other interlink connection node.

Instead, when it is set to transmit the Ethernet frame to a terminal under command, any one of the interlink connection nodes belonging to the group operates as follows. When the interlink connection node detects that its port P3 is invalid, the interlink connection node sends the special RPR frame to instruct other interlink connection node in the group to take over the role of the node. Consequently, only the interlink connection node which receives the special RPR frame transmits the Ethernet frame to a terminal under command.

It is assumed that an RPR node which does not belong to the interlink connection node group employs round robin or weighted round robin and determines a destination address (step S12 in FIG. 10). In this case, by deleting the MAC address of the RPR node whose port P3 is invalid from the address mapping table 600, the MAC address is automatically deleted from destination addresses to be selected.

It is assumed that, in place of the above, an RPR node which does not belong to the interlink connection node group performs an MAC address determining process in accordance with a parameter of an Ethernet frame. In this case, when the special RPR frame for notification of deletion is received, the address mapping table managing unit 610 of each of the RPR nodes notifies the RPR frame generator 520 to assign the parameter value corresponding to the interlink connection node as the transmitter of the frame to the other interlink connection node. In this case, the address mapping table managing unit 610 pre-stores the parameter value assigned to each of the interlink connection nodes by the interlink connection node. The RPR frame generator 520 assigns the parameter value corresponding to the interlink connection node as the transmitter of the special RPR frame for notification of deletion to the other interlink connection node belonging to the same group to which the interlink connection node belongs, and performs the MAC address determining process. In this case as well, the MAC address of the RPR node whose port P3 became invalid is automatically excluded from addresses to be selected.

By the operation as described above, when trouble occurs in the interlink 420, the RPR node 100 corresponding to the interlink 420 can be prevented from being selected as the destination of a frame transferred from the RPR network 10 to the RPR network 20. Also in the case where a search for the FDB 540 fails and an RPR frame is broadcast-transmitted and the case where an RPR frame is multicast-transmitted to an interlink connection node group, one of RPR nodes (110 and 160) connected to normal interlinks (430 and 440) transmits an Ethernet frame to a terminal under command. The operation is similarly performed also in the case of transferring an Ethernet frame from the RPR network 20 to the RPR network 10. Therefore, even when trouble occurs in any of interlinks, communication between the RPR networks 10 and 20 can be continued.

Further, also in the case where trouble occurs in any of the other interlinks 430 and 440, the RPR nodes of the RPR networks 10 and 20 operate in a manner similar to the case where trouble occurs in the interlink 420. As a result, the communication can be continued via an interlink where no failure occurs.

Next, the operations performed in the case where the failure in the interlink 420 is repaired and the port state of the port P3 of the RPR node 100 changes to a valid state will be described.

FIG. 13 is a flowchart showing an example of operations of RPR nodes in the RPR network 10 in the case where trouble in the interlink 420 is repaired. When the failure in the interlink 420 is repaired, the RPR node 100 corresponding to the interlink 420 detects that the port state of the port P3 of the node itself becomes valid by the port state monitoring unit 620 (step S51). The port state monitoring unit 620 notifies the address mapping table managing unit 610 of the fact that the port P3 became valid.

Similarly, in the RPR network 20, the port state monitoring unit 620 in the RPR node 200 corresponding to the interlink 420 detects that the port P3 of the node of itself became valid and notifies the address mapping table managing unit 610 of the fact. The operations of the RPR node 200 and other RPR node belonging to the RPR network 20 are similar to those of the RPR node 100 and other RPR node belonging to the RPR network 10. In the following, with reference to FIG. 13, the operations of the RPR node 100 and other RPR node belonging to the RPR network 10 will be described.

When it is notified that the port P3 became valid, the address mapping table managing unit 610 in the RPR node 100 determines whether the node of itself belongs to an interlink connection node group or not with reference to the interlink connection node group table 590. Since the operation has been described by referring to FIG. 4 (step S42), the detailed description will not be repeated. In the case where the node of the unit 610 belongs to the interlink connection node group, the address mapping table managing unit 610 adds the MAC address of the node to the address mapping table 600 (step S52). That is, a virtual MAC address associated with the MAC address of the node in the interlink connection node group table 590 is retrieved in the address mapping table 600, and the MAC address of the node is added as the MAC address associated with the virtual MAC address.

Further, to all of the RPR nodes belonging to the RPR network 10, the address mapping table managing unit 610 in the RPR node 100 broadcast-transmits an instruction to add the MAC address of the RPR node 100 to the address mapping table 600 (step S53). The broadcast transmission is performed by the RPR switch processing unit 530.

As the notifying process, for example, the address mapping table managing unit 610 sets the MAC address of node to which the instruction is to be notified as the destination MAC address, sets the MAC address of the node of itself (the RPR node 100 in the embodiment) as the transmitter MAC address, generates a special RPR frame in which the virtual MAC address of the interlink connection node group to which the node of itself belongs is contained in the payload, and broadcast-transmits the special RPR frame. In the following, the special RPR frame will be described as a special RPR frame for notification of addition.

When the special RPR frame for notification of addition is received, each of the RPR nodes 110 to 170 supplies it to the address mapping table managing unit 610 from the frame analyzer 510-1 or 510-2.

The address mapping table managing unit 610 adds the MAC address of the transmitter of the special RPR frame for addition, that is, the MAC address of the RPR node 100 to the entry of the group "A" in the address mapping table 600 (step S54).

The address mapping table managing unit 610 transmits the special RPR frame for notification of addition to the next RPR node via the RPR switch processing unit 530 (step S55).

As a result, the MAC address of the RPR node 100 whose port P3 became valid is added to the address mapping table 600 of each of the RPR nodes belonging to the RPR network 10, and the state before occurrence of the failure in the interlink 420 is restored. Similarly, the MAC address of the RPR node 200 whose port P3 became valid is added to the address mapping table 600 of each of the RPR nodes belonging to the RPR network 20, and the state before occurrence of the failure in the interlink 420 is restored.

It is now assumed that each of the interlink connection nodes determines whether an Ethernet frame in an RPR frame is transmitted to a terminal under command or not in accordance with the parameter in the RPR frame. It is also assumed that the interlink connection node whose port P3 became invalid notifies other interlink connection node in the same group of the instruction to take over the parameter value of the node itself. In this case, the interlink connection node whose port P3 became valid with recovery of the interlink notifies the interlink connection node as the destination of the takeover instruction of the instruction of stopping the takeover. The notification may be given by the special RPR frame. The interlink connection node which has received the special RPR frame requests the RPR switch processing unit 530, even if an RPR frame matching the taken parameter value is received, not to transmit the Ethernet frame in the RPR frame to a terminal under command by the address mapping table managing unit 610. The interlink connection node whose port P3 became valid restarts transmission of the Ethernet frame to the terminal under command in a manner similar to the transmission before the occurrence of the failure in the interlink. As a result, each of the interlink connection nodes can transmit the Ethernet frame to the terminal under the node in a manner similar to that before the occurrence of the failure in the interlink.

It is now assumed that a node determined to transmit an Ethernet frame stored in an RPR frame to a terminal under the node is any one of interlink connection nodes in the same group. It is also assumed that the interlink connection node whose port P3 became invalid transmits a special RPR frame that instructs transmission of an Ethernet frame to the other interlink connection node belonging to the same group. In this case, the interlink connection node whose port P3 became valid in association with recover of the interlink transmits a special RPR frame that instructs to stop transmitting the Ethernet frame to the interlink connection node as the destination of the special RPR frame. After that, the interlink connection node which receives the special RPR frame does not transmit the Ethernet frame to the terminal under the node even if the RPR frame which is broadcast-transmitted or multicast-transmitted is received. On the other hand, the interlink connection node whose port P3 became valid restarts transmission of the Ethernet frame to the terminal under the node in a manner similar to that before occurrence of the failure in the interlink. As a result, the mode of transmitting the Ethernet frame between RPR networks becomes similar to that before the occurrence of the failure in the interlink.

Further, it is assumed that an RPR node which does not belong to the interlink connection node group employs round robin or weighted round robin and performs the MAC address determining process (step S12 in FIG. 10). When the MAC address of the RPR node whose port P3 became valid is added to the address mapping table 600, the MAC address of the RPR node whose port P3 became valid is added as an address to be selected. Therefore, such an MAC address also becomes an address to be selected in the MAC address determining process like the address before occurrence of the failure in the interlink.

It is also assumed that an RPR node which does not belong to the interlink connection node group performs an MAC address determining process in accordance with a parameter of an Ethernet frame. When the special RPR frame for notification of deletion is received, the address mapping table managing unit 610 of each of the RPR nodes which do not belong to the interlink connection node group notifies the RPR frame generator 520 to assign the parameter value corresponding to the interlink connection node as the transmitter of the frame to the other interlink connection node. In this case, when the special RPR frame for notification of addition is received, the address mapping table managing unit 610 notifies the RPR frame generator 520 to assign the parameter value assigned to the other interlink connection node to the interlink connection node as the transmitter of the special RPR frame for notification of addition. As a result, the RPR frame generator 520 restarts the MAC address determining process like the manner before the occurrence of the failure in the interlink.

By the operation as described above, at the time of transferring an Ethernet frame from the RPR network 10 to the RPR network 20, not only an RPR node connected to a normal interlink but also the RPR node 100 connected to the recovered interlink 420 are selected as the destination of an RPR frame obtained by encapsulating the Ethernet frame. Also in the case where a search for the FDB 540 fails and an RPR frame is broadcast-transmitted and the case where an RPR frame is multicast-transmitted to an interlink connection node group, one of RPR nodes (100, 110 and 160) connected to the interlinks 420, 430 and 440 transmits an Ethernet frame to a terminal under the node. Therefore, the state before the occurrence of the failure in the interlink 420 can be restored.

In the above-described mode, the address mapping table managing unit 610 of the interlink connection node updates the address mapping tables 600 in all of the RPR nodes belonging to the RPR network by broadcast-transmitting the special RPR frame using detection of trouble in an interlink as a trigger. In the following mode, the RPR nodes 100 to 170 update the address mapping tables 600 using a topology and protection frame (herein below, written as "TP frame") of the RPR used to manage the topology of an RPR network.

According to the "IEEE Standards 802.17", to manage the topology of an RPR network, an RPR node broadcast-transmits a TP frame storing port states of ports (ports P1 and P2) connected to a neighboring RPR node from both of the ports P1 and P2 at predetermined time intervals. The TP frame is not a special RPR frame.

Each of RPR nodes of the embodiment described below broadcast-transmits a TP frame at predetermined time intervals. The TP frame stores the port state of a port (port P3) connected to a terminal under the node in addition to the port states of ports (ports 21 and P2) connected to the neighboring RPR nodes.

The TDB 560 of each of the RPR nodes stores the state of the port P3 of the RPR node in addition to the port states of the ports P1 and P2 of the RPR nodes belonging to the same RPR network to which the RPR node of itself belongs. FIG. 14 is an explanatory diagram showing an example of information registered in the TDB 560. In the example shown in FIG. 14, the information indicative of the states of the ports P1, P2, and P3 of the RPR nodes belonging to the RPR network 10 is registered in the TDB 560. In a manner similar to the case shown in FIG. 5, the information indicative of the states of the ports is registered so as to be associated with node identifiers of the RPR nodes. As the node identifiers of the RPR nodes, the MAC addresses of the RPR nodes are used.

In the operating mode in the case where trouble occurs in an interlink, the case where trouble occurs in the interlink 420 will be described as an example like in the above description. An RPR node belonging to the RPR network 10 will be described but an RPR node belonging to the RPR network 20 will not be described.

When trouble occurs in the interlink 420 and the state of the port P3 of the RPR node 100 changes from the valid state to the invalid state, the port state monitoring unit 530 of the RPR node 100 changes the valid state of the port P3 of the node of itself in the TDB 560 to the invalid state.

When the TDB 560 is changed, the RPR switch processing unit 530 in the RPR node 100 broadcast-transmits a TP frame indicating that the port P3 of the RPR node 100 is invalid at predetermined time intervals.

When the TP frame is input to the frame analyzers 510-1 and 510-2 of other RPR node belonging to the RPR network 10, the frame analyzers 510-1 and 510-2 send the TP frame to the RPR switch processing unit 530. The RPR switch processing unit 530 to which the TP frame is transmitted records the fact that the port P3 of the RPR node 100 is invalid into the TDB 560 of the node of itself.

When each of the nodes including the RPR node 100 in the RPR network 10 detects that the port state of the port P3 of the RPR node 100 in the TDB 560 changes to the invalid state by the address mapping table managing unit 610, each of the nodes determines whether the RPR node 100 belongs to the interlink connection node group or not. For example, when the MAC address of the RPR node whose state of the port P3 in the TDB 560 changes is included in the interlink connection node group table 590, it may be determined that the RPR node whose port P3 became invalid belongs to the interlink connection node group. When it is determined that the RPR node whose port P3 became invalid belongs to the interlink connection node group, the address mapping table managing unit 610 deletes the MAC address of the RPR node from the address mapping table 600 of the node of itself.

As a result, in the address mapping table 600 of each of the RPR nodes, the MAC address of the RPR node 100 whose port P3 became invalid is deleted.

It is now assumed that an interlink connection node determines whether an Ethernet frame in an RPR frame is transmitted to a terminal under the node or not in accordance with a parameter in the RPR frame. In this case, for example, by operation similar to the operation described above, other interlink connection node may take over the transmission of the Ethernet frame performed by the interlink connection node whose port P3 became invalid.

It is now assumed that only one of interlink connection nodes in the same group is set as a node for transmitting an Ethernet frame to a terminal under the node. In this case as well, by operation similar to the operation described above, other interlink connection node may take over the transmission of the Ethernet frame performed by the interlink connection node whose port P3 became invalid.

It is assumed that an RPR node which does not belong to the interlink connection node group employs round robin or weighted round robin and performs the MAC address determining process. When the MAC address of the RPR node whose port P3 became invalid is deleted from the address mapping table 600, the MAC address of the RPR node whose port P3 became invalid is excluded from objects to be selected.

It is assumed that an RPR node which does not belong to the interlink connection node group performs an MAC address determining process in accordance with a parameter of an Ethernet frame. In this case, when an RPR node whose state of the port P3 became invalid in the TDB 560 is an interlink connection node, the address mapping table managing unit 610 of each of the RPR nodes which do not belong to the interlink connection node group may notify the RPR frame generator 520 to assign a parameter value corresponding to the interlink connection node to the other interlink connection node. In this case, the address mapping table managing unit 610 in each of the RPR nodes which do not belong to the interlink connection node group may pre-store the parameter value assigned to each of the interlink connection nodes by the interlink connection node. According to the notification, the RPR frame generator 520 assigns the parameter value of the interlink connection node whose state of the port P3 became invalid to the other interlink connection node belonging to the same interlink connection node group to which the interlink connection node belongs. In this case as well, the MAC address of the RPR node whose port P3 became invalid is automatically excluded from options in the address determining process.

When the MAC address of the RPR node 100 is deleted from the address mapping table 600 and, after that, trouble in the interlink 420 is recovered, the RPR node 100 changes the state of the port P3 of the node itself stored in the TDB 560 to the valid state by the port state monitoring unit 530.

When the TDB 560 in the RPR node 100 is changed as described above, the RPR switch processing unit 530 in the RPR node 100 broadcast-transmits, at predetermined time intervals, the TP frame in which the state of the port P3 in the RPR node 100 is changed from the invalid state to the valid state.

As already described, the RPR switch processing unit 530 to which the TP frame is input updates information stored in the TDB 560 in the node of itself in accordance with the port state indicated in the TP frame. In this case, the RPR switch processing unit 530 of each of the RPR nodes updates the information of the port state of the port P3 of the RPR node 100 stored in the TDB 560 from the invalid state to the valid state.

When each of the nodes including the RPR node 100 in the RPR network 10 detects that the port state of the port P3 of the RPR node 100 changes to the valid state in the TDB 560 by the address mapping table managing unit 610, the node determines whether the RPR node 100 whose port P3 became valid belongs to the interlink connection node group or not in the interlink connection node group table 590 of the node itself. The determination is similar to the above-described one. In the case where it is determined that the RPR node whose port P3 became valid belongs to the interlink connection node group, the address mapping table managing unit 610 recognizes a virtual MAC address corresponding to the MAC address of the interlink connection node whose port P3 became valid with reference to the interlink connection node group table 590. The address mapping table managing unit 610 adds the MAC address of the interlink connection node (100) whose port P3 became valid to the address mapping table 600.

As a result, information stored in the address mapping table 600 of each of the RPR nodes is similar to that before occurrence of the failure in the interlink 420.

In the case where each of the interlink connection nodes determines whether an Ethernet frame is transmitted to a terminal under the node or not in accordance with a parameter of the RPR frame, it is sufficient to restore a mode similar to that before occurrence of the failure in the interlink by operation similar to that described above.

Also in the case where only one interlink connection node is determined to send an Ethernet frame to a terminal under the node, it is sufficient to restore a mode similar to that before occurrence of the failure in the interlink by operation similar to that described above.

It is assumed that an RPR node which does not belong to the interlink connection node group employs round robin or weighted round robin and performs the MAC address determining process. When the MAC address of the RPR node whose port P3 became valid is added to the address mapping table 600, the MAC address is added as an object to be selected.

It is now assumed that an RPR node which does not belong to the interlink connection node group performs an MAC address determining process in accordance with a parameter of an Ethernet frame. It is assumed that the address mapping table managing unit 610 of each of the RPR nodes notifies the RPR frame generator 520 to assign the parameter value corresponding to the interlink connection node whose state of the port P3 is changed from the valid state to the invalid state to the other interlink connection node. In this case, when the state of the port P3 is changed from the invalid state to the valid state in the TDB 560 and the RPR node is the interlink connection node, the address mapping table managing unit 610 notifies the RPR frame generator 520 to set the value of the parameter assigned to the other inter link connection node to the original state before occurrence of the failure in the interlink.

As described above, by utilizing the TP frame, the failure repairing operation similar to that in the case of using the special RPR frame for notification of deletion and the special RPR frame for addition can be realized.

Next, trouble repairing operation in the case where trouble occurs in an interlink connection node, not in a link between nodes, will be described. The case where trouble occurs in the RPR node 100 will be described as an example. The following operation is performed on precondition that the TDB 560 in each of the RPR nodes manages the port states of the ports P1, P2, and P3 by RPR node as shown in FIG. 14. In the following operation, a TP frame is used as a keep-alive frame.

Each of RPR nodes broadcast-transmits a TP frame indicative of the state of each of the ports P1, P2, and P3 of the node at predetermined time intervals. When trouble occurs in the RPR node 100, the RPR node 100 becomes unable to transmit a TP frame. No TP frame is delivered from the RPR node 100 to the other RPR node belonging to the RPR network 10.

When the state where no TP frame arrives from any of the RPR nodes continues for predetermined time or longer, the RPR switch processing unit 530 of each of the RPR nodes belonging to the RPR network 10 determines that trouble occurs in the RPR node. The predetermined time is set to be longer than the transmission time interval of the TP frame. In the embodiment, when the state where no TP frame from the RPR node 100 arrives continues for predetermined time, the RPR switch processing unit 530 in each of the RPR nodes belonging to the RPR network 10 detects occurrence of trouble in the RPR node 100. The RPR switch processing unit 530 changes the port state of the ports P1, P2, and P3 of the RPR node 100 in the TDB 560 in the node of itself to the invalid state.

When the change in the TDB 560 is detected, the address mapping table managing unit 610 in each of the RPR nodes in which no failure occurs determines whether the RPR node 100 which became invalid belongs to the interlink connection node group or not by referring to the interlink connection node group table 590 of the node of itself. When the MAC address of the RPR node 100 is included in the interlink connection node group table 590, it is determined that the RPR node 100 belongs to the interlink connection node group. When it is determined that the RPR node 100 in which trouble occurs belongs to the interlink connection node group, the address mapping table managing unit 610 deletes the MAC address of the RPR node 100 from the address mapping table 600.

As a result, the MAC address of the RPR node 100 in which trouble occurs is deleted from the address mapping table 600 of each of the RPR nodes in the RPR network 10.

When an RPR frame is received, each of the interlink connection nodes determines whether an Ethernet frame is transmitted to a terminal under the node or not in accordance with a parameter of the frame. In this case, the address mapping table managing unit 610 of an interlink connection node which has detected occurrence of trouble in other RPR node determines whether the RPR node is an interlink connection node or not by referring to the TDB 560 and the interlink connection node group table 590. In the case where the RPR node in which trouble occurs is an interlink connection node, the address mapping table managing unit 610 reads the MAC address of the interlink connection node from the TDB 560 and notifies the RPR switch processing unit 530 of the MAC address. The RPR switch processing unit 530 assigns a parameter value corresponding to the interlink connection node to the other interlink connection node. In this case, it is sufficient for the RPR switch processing unit 530 in each of the interlink connection nodes to pre-store the parameter value assigned to each of the interlink connection nodes by the interlink connection nodes. The RPR switch processing unit 530 in each of the interlink connection nodes in which no failure occurs assigns the parameter value corresponding to the interlink connection node in which trouble occurs to the other interlink connection node and, after that, determines whether an Ethernet frame is transmitted to a terminal under command or not in accordance with the assignment. As a result, other interlink connection node can take over the transmission of the Ethernet frame performed by the interlink connection node in which the failure occurs.

It is assumed that only one interlink connection node is determined to send an Ethernet frame to a terminal under the node. In this case, when trouble occurs in an interlink connection node that transmits the Ethernet frame, any one of the other interlink connection nodes may take over the transmission of the Ethernet frame. In this case, an interlink connection node which takes over transmission of the Ethernet frame when trouble occurs in a certain interlink connection node may be determined in advance. When occurrence of trouble in an interlink connection node is detected on the basis of a change in the port state in the TDB 560, the RPR switch processing unit 530 in each of the other interlink connection nodes determines whether the node of itself takes over the transmission of the Ethernet frame or not. According to the result of determination, whether or not the Ethernet frame stored in the received RPR frame is transmitted to a terminal under command may be determined.

It is assumed that an RPR node which does not belong to the interlink connection node group employs round robin or weighted round robin and performs the MAC address determining process. When the MAC address of the RPR node in which trouble occurs is deleted from the address mapping table 600, the MAC address of the RPR node in which trouble occurs is excluded from objects to be selected.

It is now assumed that an RPR node which does not belong to the interlink connection node group performs an MAC address determining process in accordance with a parameter of an Ethernet frame. In this case, the address mapping table managing unit 610 of each of the RPR nodes determines whether the RPR node in which trouble occurs is an interlink connection node or not with reference to the TDB 560 and the interlink connection node group table 590. In the case where the RPR node in which trouble occurs is an interlink connection node, the address mapping table managing unit 610 notifies the RPR frame generator 520 to assign the parameter value corresponding to the interlink connection node to the other interlink connection node. In this case, the address mapping table managing unit 610 in each of the RPR nodes which do not belong to the interlink connection node group may pre-store parameter values assigned to the interlink connection nodes by the interlink connection nodes. According to the notification from the address mapping table managing unit 610, the RPR frame generator 520 may assign the parameter value corresponding to the interlink connection node in which trouble occurs to the other interlink connection node belonging to the same interlink connection node group to which the interlink connection node belongs, and perform the MAC address determining process.

By the operation as described above, at the time of transferring an Ethernet frame from the RPR network 10 to the RPR network 20, the RPR node 100 in which trouble occurs is excluded from objects to be selected as a destination of an RPR frame encapsulating the Ethernet frame. Any one of the normal RPR nodes 110 and 160 is selected. Also in the case where a search for the FDB 540 fails and an RPR frame is broadcast-transmitted and the case where an RPR frame is multicast-transmitted to an interlink connection node group, one of the normal RPR nodes 110 and 160 transmits an Ethernet frame to a terminal under the node. Therefore, even when trouble occurs in the RPR node 100, the process of transfer from the RPR network 10 to the RPR network 20 can be continued.

On the other hand, when trouble occurs in the RPR node 100, for the RPR node 200, it is the same state as the state where trouble occurs in the interlink 420 (communication with the RPR node 100 cannot be performed). Therefore, in the case where trouble occurs in the RPR node 100, the RPR node 200 detects occurrence of trouble in the interlink 420, and an RPR node belonging to the RPR network 20 performs operation similar to that performed in the case where trouble occurs in the interlink. Therefore, the communication from the RPR network 20 to the RPR network 10 can be also continued.

As a result, the interlink 420 connected to the RPR node 100 in which trouble occurs is not used for transfer of an Ethernet frame, and only the interlinks 430 and 440 are used for transfer of an Ethernet frame. Thus, communication between the RPR networks 10 and 20 can be continued.

Next, operations in the case where trouble in the RPR node 100 is repaired and the port states of the ports P1 to P3 of the RPR node 100 change from the invalid state to the valid state will be described.

The RPR node 100 recovered from the failure broadcast-transmits a TP frame indicating that all of the ports P1, P2, and P3 of the node are valid at predetermined time intervals. Each of the other RPR nodes belonging to the RPR network 10 receives the TP frame from the RPR node 100 and detects recover of the RPR node 100 by the RPR switch processing unit 530. The RPR switch processing unit 530 changes the port states of the ports P1, P2, and P3 of the recovered RPR node 100 from the invalid state to the valid state in the TDB 560 in the node of itself.

When a change in the state of the port P3 of the RPR node 100 in the TDB 560 from the invalid state to the valid state is detected, the address mapping table managing unit 610 in each of the RPR nodes determines whether the RPR node 100 belongs to the interlink connection node group or not with reference to the interlink connection node group table 590 in the node of itself. In the case where it is determined that the RPR node 100 recovered from the failure belongs to the interlink connection node group, the address mapping table managing unit 610 adds the MAC address of the RPR node 100 to the entry of the interlink connection node group to which the RPR node 100 recovered from the failure belongs in entries of the address mapping table 600 of the node of itself.

As a result, the MAC address of the RPR node 100 recovered from the failure is added to the address mapping table 600 of each of the RPR nodes in the RPR network 10.

It is now assumed that each of the interlink connection nodes determines whether an Ethernet frame in a RPR frame is transmitted to a terminal under the node or not in accordance with a parameter of the frame. The RPR switch processing unit 530 of each of the interlink connection nodes assigns the value of the parameter corresponding to an interlink connection node in which trouble occurs to the other interlink connection node. In this case, when it is found that the recovered RPR node is an interlink connection node with reference to the TDB 560, the address mapping table managing unit 610 reads the MAC address of the interlink connection node from the TDB 560 and notifies the RPR switch processing unit 530 of the MAC address. The RPR switch processing unit 530 assigns the parameter value to each of the interlink connection nodes in a manner similar to the assignment before occurrence of the failure. As a result, each of the interlink connection nodes can transmit the Ethernet frame to a terminal under the node in a manner similar to the transmission before occurrence of the failure.

It is assumed that only one interlink connection node is determined to send an Ethernet frame to a terminal under the node. It is also assumed that trouble occurs in the interlink connection node, and other interlink connection node takes over the transmission of the Ethernet frame. In this case, when recovery of the failed interlink connection node is detected on the basis of a change in the port state in the TDB 560, the RPR switch processing unit 530 of the interlink connection node taking over the transmission recognizes that it does not transmit the Ethernet frame to the terminal under command as before occurrence of the failure. On the other hand, the interlink connection node recovered from the failure transmits the Ethernet frame to the terminal under the node as before occurrence of the failure.

It is assumed that an RPR node which does not belong to the interlink connection node group employs round robin or weighted round robin and performs the MAC address determining process. When the MAC address of the RPR node recovered from trouble is added to the address mapping table 600, the address becomes again an object to be selected.

It is also assumed that an RPR node which does not belong to the interlink connection node group performs an address determining process in accordance with a parameter of an Ethernet frame. It is assumed that the address mapping table managing unit 610 of each of the RPR nodes notifies the RPR frame generator 520 to assign the parameter value corresponding to the interlink connection node in which trouble occurs to the other interlink connection node. In this case, when recovery of the interlink connection node is detected on the basis of a change in the port state in the TDB 560, the address mapping table managing unit 610 in each of the RPR nodes notifies the RPR frame generator 520 to re-assign the parameter value assigned to the other interlink connection node to the recovered interlink connection node. The RPR frame generator 520 performs the re-assignment of the parameter value and the MAC address determining process.

By the operation as described above, at the time of transferring an Ethernet frame from the RPR network 10 to the RPR network 20, the recovered RPR node 100 becomes again an option as a destination of an RPR frame encapsulating the Ethernet frame. The operation is similarly performed also in the case where a search for the FDB 540 fails and an RPR frame is broadcast-transmitted and the case where an RPR frame is multicast-transmitted to an interlink connection node group.

By the recovery of the RPR node 100 from the failure, the RPR node 200 becomes the same state (the state where communication can be performed with the RPR node 100) as that when the interlink 420 recovers from the failure. Therefore, in the case where the RPR node 100 recovers from the failure, the RPR node 200 detects recovery from the failure of the interlink 420, and the RPR node belonging to the RPR network 20 may perform operation similar to that when the interlink recovers from trouble. As a result, transfer of the Ethernet frame from the RPR network 20 to the RPR network 10 via the interlink 420 is restarted.

As described above, in the case where the RPR node 100 recovers from the failure, the operation of the communication system becomes similar to that in the normal mode before occurrence of the failure in the RPR node 100.

Next, operations in the case where trouble occurs in two links on both sides of an interlink connection node in an RPR network (10 or 20). As an example, the case where trouble occurs in each of a link between the RPR nodes 100 and 110 and a link between the RPR nodes 100 and 170 in the RPR network 10 will be described. In this case, the RPR node 100 becomes isolated from the RPR network 10.

In the case where such trouble occurs, the RPR nodes belonging to the RPR network 10 can recognize that communication with the RPR node 100 is disabled, that is, the interlink 420 becomes unusable by the topology discovery protocol.

When the RPR node 100 detects occurrence of trouble in the link of the node itself, although no failure occurs in the interlink 420, the RPR node 100 invalidates the port P3 for connection to the RPR node 200. As a result, the RPR node 200 recognizes that trouble occurs in the interlink 420. Each of the RPR nodes belonging to the RPR network 20 performs operation similar to that in the case where trouble occurs in an interlink. Thus, communication from the RPR network 20 to the RPR network 10 is continued by using the interlink 430 or 440.

It is assumed that even if the failure occurs, the RPR node 100 does not invalidate the port P3 of the node itself. In this case, the RPR network 20 side cannot recognize that the interlink 420 cannot be substantially used. As a result, a situation occurs such that the Ethernet frame transmitted from a terminal under command belonging to the RPT network 20 is transferred to the RPR node 100 via the interlink 420 and cannot be transferred further. Therefore, the situation can be avoided in such a manner that the RPR node 100 invalidates the port P3 of the node itself and makes each of the RPR nodes in the RPR network 20 perform operation similar to that performed when trouble occurs in the interlink 420.

When each of the RPR nodes belonging to the RPR network 10 recognizes that communication with the RPR node 100 is disabled due to a link failure, the RPR node performs operation similar to that in the case where trouble occurs in the RPR node 100 itself. As a result, the communication from the RPR network 10 to the RPR network 20 can be also continued.

It is also assumed that at least one of the two links in which trouble occurs recovers. When the recovery is detected, the RPR node 100 changes the port state of the port P3 of the node itself to the valid state.

The RPR node 200 detects recovery of the interlink 420. Each of the RPR nodes in the RPR networks performs operation similar to that when the interlink recovers from the failure. As a result, frame transfer from the RPR network 20 to the RPR network 10 via the interlink 420 is restarted.

Each of the link between the RPR nodes 100 and 110 and the link between the RPR nodes 100 and 170 recovers from the failure, and each of the RPR nodes in the RPR network 10 recognizes that communication with the RPR node 100 is enabled. Each of the RPR nodes in the RPR network 10 performs operation similar to that performed when the interlink connection node recovers from trouble. As a result, frame transfer from the RPR network 20 to the RPR network 10 via the interlink 420 is also restarted.

Even in the case where trouble occurs in each of links on both sides of an interlink connection node, by changing the state of the port for interlink (port P3) in the interlink connection node, communication between the RPR networks can be maintained.

Next, recovery from trouble in the case where trouble occurs in a link between RPR nodes or trouble occurs in an RPR node other than an interlink connection node in the RPR network 10 and/or the RPR network 20 will be described.

It is assumed that trouble occurs in one place in each of the RPR networks. Therefore, it is assumed that a link failure or node failure occurs in one place in a single RPR network.

In the case where such trouble occurs, by a protection function called "steering" or "wrapping" in the "IEEE Standards 802.17", communication between normal RPR nodes can be continued. Consequently, it is unnecessary to perform a special process. Therefore, even when a link failure or node failure occurs, the communication between the RPR networks 10 and 20 can be continued.

Second Embodiment

Figure 15:
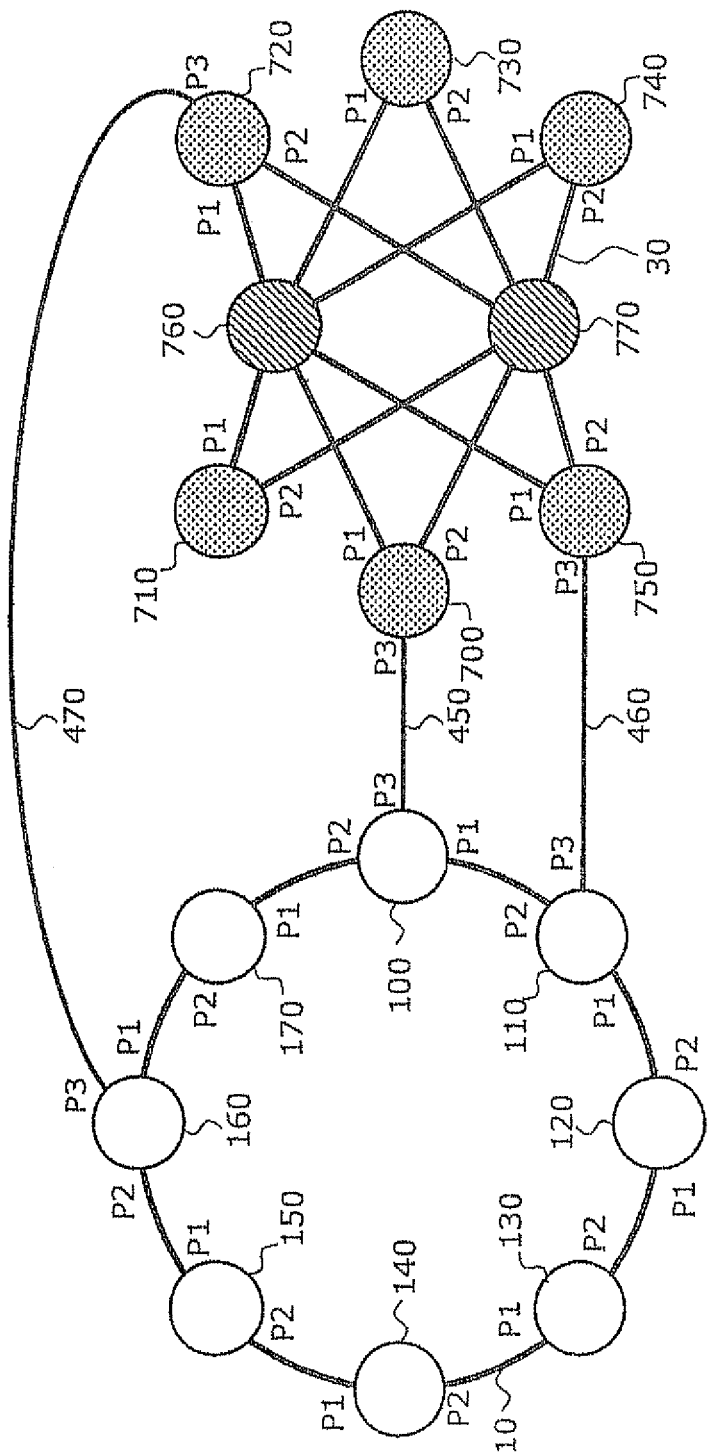
FIG. 15 is an explanatory diagram showing a second embodiment of a communication system according to the present invention.

FIG. 15 is an explanatory diagram showing a second embodiment of a communication system according to the present invention. The same reference numerals as those of FIG. 1 are designated to components similar to those of the first embodiment and their description will not be repeated.

In the example shown in FIG. 15, the communication system includes an RPR network 10 having RPR nodes 100 to 170 and an EoE (Ethernet over Ethernet) network 30 having EoE nodes 700 to 770. The EoE nodes include an EoE edge node accommodating a terminal under the node, and an EoE core node for relaying an EoE frame without accommodating a terminal under the node. A terminal under the EoE edge node may be an RPR node belonging to an RPR network. In the example shown in FIG. 15, the RPR node 100 and the EoE node 700 are connected to each other via an interlink 450. The RPR node 110 and the EoE node 750 are connected to each other via an interlink 460. The RPR node 160 and the EoE node 720 are connected to each other via an interlink 470.

In the EoE network, an inlet-side EoE edge node accommodating an Ethernet frame transmitting terminal under the node generates an EoE frame by encapsulating an Ethernet frame received from the terminal under the node with an EoE frame. The EoE frame output from the EoE edge node is transferred to an outlet-side EoE edge node accommodating a destination terminal by relay of the EoE core node. The outlet-side EoE edge node transfers the Ethernet frame extracted from the EoE frame to the terminal under the node. As the Ethernet frame is encapsulated in the RPR network, the Ethernet frame is encapsulated also in the EoE network.

In the example shown in FIG. 15, the EoE nodes 700, 710, 730, 740, and 750 are EoE edge nodes. The EoE nodes 760 and 770 are EoE core nodes. The EoE edge nodes 700, 720, and 750 connected to the interlinks 450, 470, and 460, respectively, are also interlink connection nodes and form an interlink connection node group.

In the EoE network, the topology is not limited to a ring and, moreover, by using an STP (Spanning Tree Protocol), a path in the EoE network can be made redundant. Consequently, the EoE network has an advantage such that a high-fault-resilient network can be realized by an Ethernet switch which can be easily set.

In the EoE network, a protocol for managing a topology such as the topology discovery protocol of an RPR or a protocol for managing a network such as OAM is not determined in advance.

In the EoE network 30 in FIG. 15, a loop is constructed by duplication of the EoE core nodes 760 and 770. In the following description, it is assumed that generation of a loop is avoided in the frame transfer process by applying the STP as the control protocol of the EoE network 30.

Next, the configuration of an EoE node will be described. Since the configuration of the EoE core nodes 760 and 770 is similar to that of a general Ethernet switch, description will not be repeated.

Figure 16:
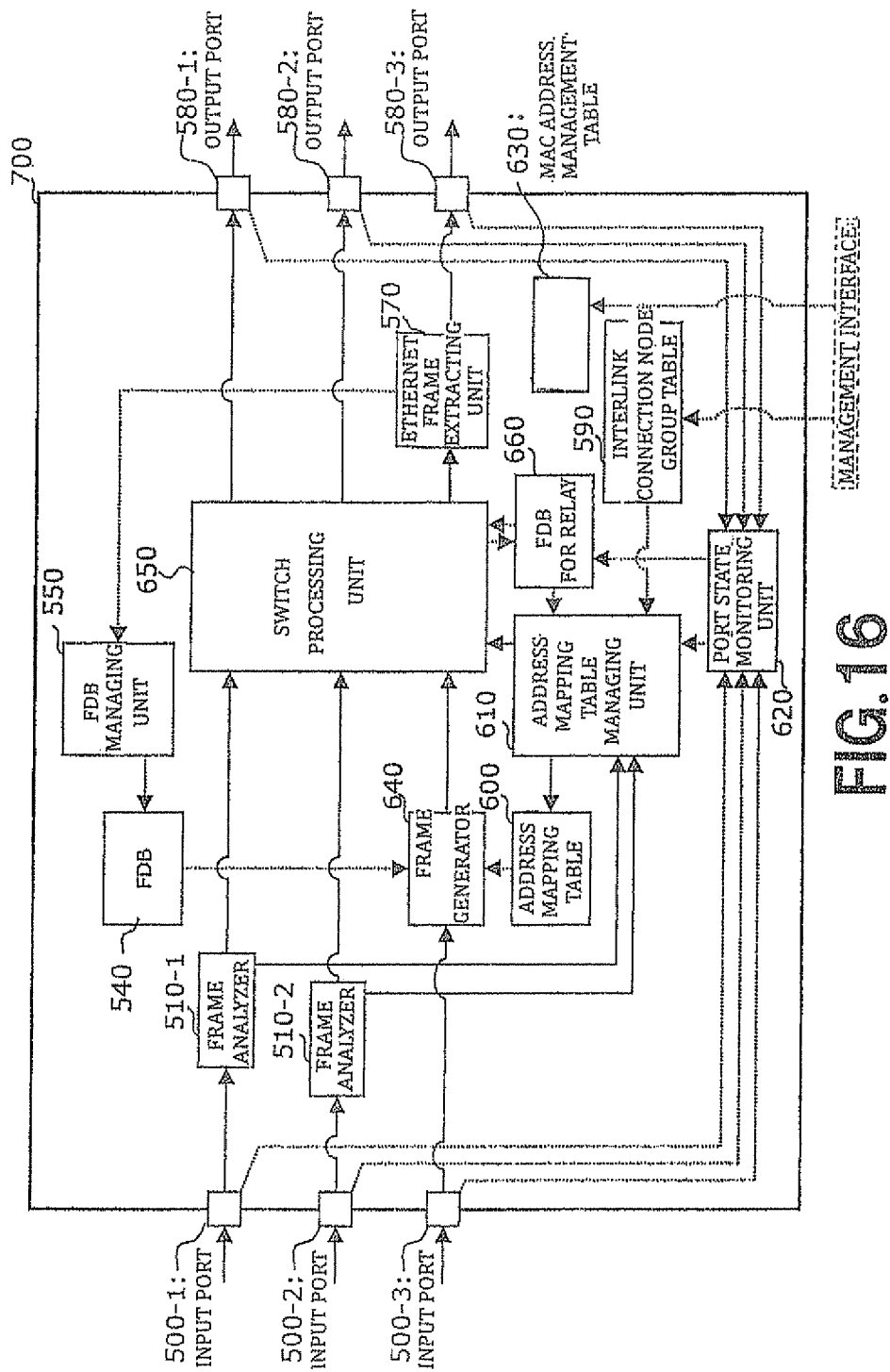
FIG. 16 is a block diagram showing an example of the configuration of an EoE edge node.

FIG. 16 is a block diagram showing an example of the configuration of an EoE edge node. In FIG. 16, the EoE edge node 700 is shown as an example. The configuration of each of the EoE edge nodes 700, 710, 720, 730, 740, and 750 is similar to that of the EoE edge node 700.

The same reference numerals as those of FIG. 3 are designated to components similar to those of an RPR node, in the components of the EoE edge node, and their description will not be repeated.

The EoE edge node 700 has a frame generator 640 in place of the RPR frame generator 520 (refer to FIG. 3) of the RPR node. The EoE edge node 700 has a switch processing unit 650 in place of the RPR switch processing unit 530 of the RPR node. The EoE edge node 700 does not have the TDB 560 but has an FDB 660 for relay used for frame transfer in the EoE network.

In the example shown in FIGS. 15 and 16, for simplicity, the case where the EoE edge node 700 has three ports P1, P2, and P3 is shown. The EoE edge node may have four or more ports like a general Ethernet switch.

The operation of the frame generator 640 is similar to that of the RPR frame generator 520 except for the point that an EoE frame, not an RPR frame, is generated at the time of encapsulating an Ethernet frame.

The operation of the switch processing unit 650 is similar to that of the RPR switch processing unit 530 except for the following points. The points different from the RPR switch processing unit 530 are a point of determining an output port of an EoE frame by referring to the FDB 660 for relay and a point that a process of the RPR protocol such as the topology discovery protocol and the fairness protocol is not performed. The other frame transfer process is similar to that of the RPR switch processing unit 530.

The FDB 660 for relay is a database for registering the corresponding relation between the MAC address of an EoE edge node in a component of the EoE network 30 and an output port of the EoE node 700. The switch processing unit 650 specifies an output port associated with the destination MAC address of the EoE frame generated by the frame generator 640 with reference to the FDB 660 for relay, and transmits the EoE frame from the output port.

FIG. 17 is an explanatory diagram showing an example of the corresponding relations registered in the FDB 660 for relay of the EoE node 700. In the example shown in FIG. 17, the MAC address of the EoE node 710 and the output port P1 are associated. Therefore, for example, when the frame generator 640 generates an EoE frame by setting the MAC address of the EoE node 710 as a destination MAC address, the switch processing unit 650 retrieves the output port P1 corresponding to the destination MAC address in an EoE frame (the MAC address of the EoE node 710) and transmits the EoE frame from the output port P1.

When an EoE frame is received, the switch processing unit 650 registers the corresponding relation between the MAC address stored as the transmitter MAC address in the EoE frame and the port that has received the EoE frame into the FDB 660 for relay.

In the FDB 660 for relay, the corresponding relation between the MAC address of a terminal under a node and the port of the node is also registered. When an EoE edge node receives an Ethernet frame from a terminal under the node, the switch processing unit 650 registers the corresponding relation between the MAC address set as the transmitter MAC address in the received Ethernet frame and the port that has received the Ethernet frame into the FDB 660 for relay. The switch processing unit 650 searches the FDB 660 for relay for a port corresponding to the destination MAC address of the Ethernet frame obtained by encapsulating an EoE frame, and determines the retrieved port as an output of the Ethernet frame.

As described above, the FDB 660 for relay performs MAC address learning in a normal Ethernet.

The FDB 540 also performs the MAC address learning. In the second embodiment, on receipt of an EoE frame, the corresponding relation between the transmitter MAC address of an Ethernet frame encapsulated in the EoE frame and the transmitter MAC address of the EoE frame is registered in the FDB 540. On receipt of the Ethernet frame, the frame generator 640 retrieves an MAC address corresponding to the destination MAC address of the Ethernet frame with reference to the FDB 540 and stores the MAC address as the destination MAC address of the EoE frame.

In the following, a frame relay operation in an EoE network will be briefly described unless otherwise it is deeply related to the operation of the present invention.

Frame transfer between a terminal under an RPR node and a terminal under an EoE edge node in the second embodiment is similar to that between terminals under RPR nodes described in the first embodiment. Specifically, it is similar to the frame transfer between a terminal under the RPR node 140 and a terminal under the RPR node 240 described in the first embodiment (refer to FIG. 1).

The frame transfer in the EoE network 30 shown in FIG. 15 is similar to that in the RPR network 10 or 20 described in the first embodiment except for the point that an RPR frame is changed to an EoE frame and the point that an output port is determined with reference to the FDB 660 for relay at the time of transferring an EoE frame in the EoE network 30.

The operations performed at the time of occurrence of trouble and at the time of recovery in the communication system of the embodiment are similar to those at the time of occurrence of trouble and at the time of recovery in the first embodiment except for the following points.

In the EoE network 30, a protocol for managing a topology is not determined. Consequently, the mode of updating the address mapping table 600 by referring to the TDB 550 described in the frame transfer at the time of trouble in an interlink in the first embodiment cannot be applied to the second embodiment. Specifically, the mode of transmitting a TP frame indicative of the state of the port P3 corresponding to an interlink at predetermined time intervals, updating the state of the port P3 in the TDB 560 by an RPR node which receives the TP frame, and updating the address mapping table 600 by the address mapping table managing unit 610 cannot be applied to the second embodiment.

Therefore, in the second embodiment, in the case where an interlink failure occurs, an interlink connection node connected to the interlink transmits a special EoE frame to request for updating of the address mapping table 600 in each of the other EoE edge nodes. The special EoE frame is similar to the special RPR frame except for the point that the frame is not an RPR frame but an EoE frame.

An EoE edge node belonging to the EoE network 30 does not transmit the TP frame at predetermined time intervals. Consequently, in the second embodiment, occurrence of trouble in an interlink connection node cannot be detected by detecting arrival of no TP frame.

Therefore, in the second embodiment, the interlink connection nodes 700, 720, and 750 in the EoE network 30 transmit the keep-alive frame at predetermined time intervals. When the keep-alive frame does not arrive for predetermined time or longer, other EoE edge nodes determine that trouble occurs in the interlink connection node. The "predetermined time" in the determination is set to be longer than the transmission time interval of the keep-alive frame. When occurrence of trouble is detected, the EoE edge node updates the address mapping table 600. In this case, the interlink connection nodes 700, 720, and 750 transmit the keep-alive frame so that the keep-alive frame arrives at each of the EoE edge nodes belonging to the EoE network. For example, the nodes broadcast-transmit the keep-alive frame.

As described above, also in the communication system shown in FIG. 15, by making the interlink between an RPR network and an EoE network redundant, a high-reliable communication system can be realized.

Third Embodiment

Figure 18:
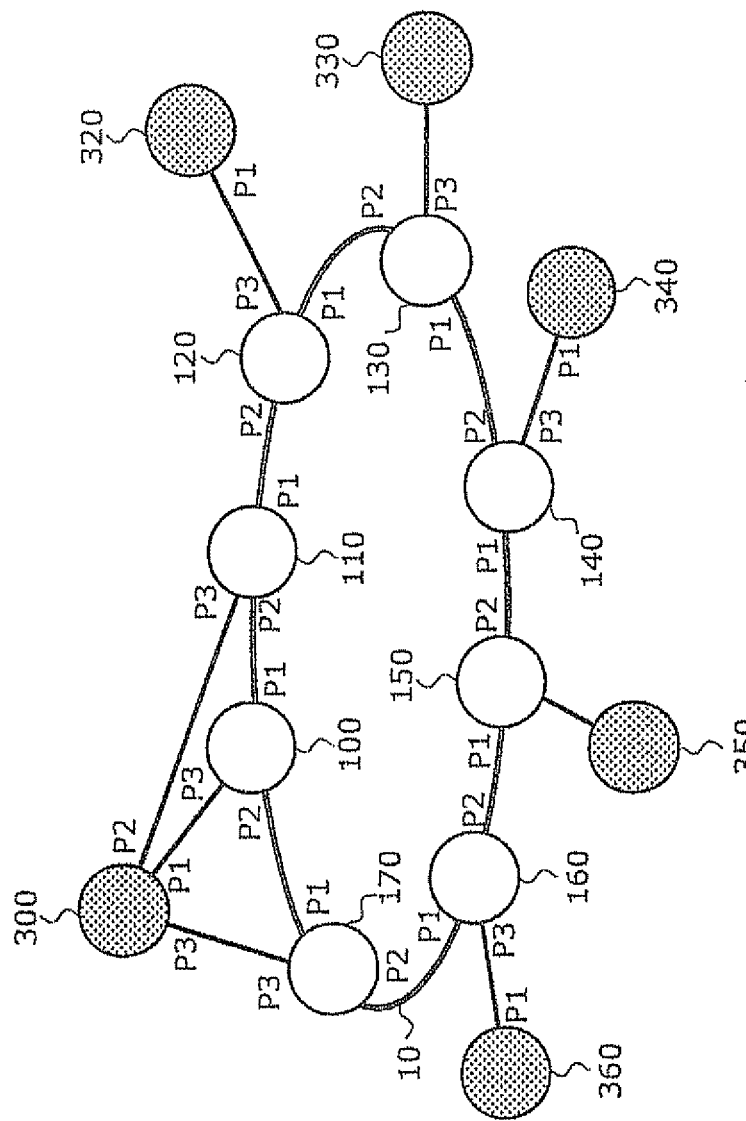
FIG. 18 is an explanatory diagram showing a third embodiment of a communication system in an embodiment.

FIG. 18 is an explanatory diagram showing a third embodiment of a communication system according to the embodiment. The RPR network 10 has the RPR nodes 100 to 170. In the example shown in FIG. 18, a common terminal 300 is accommodated under the RPR nodes 100, 110, and 170. Therefore, the RPR nodes 100, 110, and 170 are interlink connection nodes constructing an interlink connection node group. By such a configuration, the communication system shown in FIG. 18 realizes a multihoming configuration. Terminals 320, 330, 340, 350, and 360 are terminals accommodated under the RPR nodes 120, 130, 140, 150, and 160, respectively.

The configuration of each of the RPR nodes 100 to 170 is similar to that of each of the RPR nodes in the first embodiment (refer to FIG. 3).

The operations of the RPR nodes and the terminals in the third embodiment are similar to those of the first embodiment except for the following points. In the third embodiment, at the time of transmitting an Ethernet frame to an RPR node, the terminal 300 accommodated under the interlink connection nodes (100, 110, and 170) selects one of the RPR nodes 100, 110, and 170 and transmits the Ethernet frame to the selected RPR node.

The terminal 300 selects the RPR node satisfying at least the conditions described below and transmits the Ethernet frame to the selected RPR node. A first condition is that no failure occurs in the RPR node accommodating the terminal 300. When trouble occurs in any of the RPR nodes 100, 110, and 170, the terminal 300 excludes the RPR node from objects to be selected. A second condition is that no failure occurs in a link between the terminal 300 and the RPR node. For example, if trouble occurs in the link between the terminal 300 and the RPR node 100, the terminal 300 excludes the RPR node 100 from objects to be selected. The operation is performed similarly with respect to the other RPR nodes. A third condition is that an RPR node to be selected can perform communication with other RPR node belonging to the RPR network 10. For example, it is assumed that trouble occurs in each of the link between the RPR nodes 170 and 100 and the link between the RPR nodes 170 and 160. In this case, the RPR node 170 is isolated from the RPR network 10. Although no failure occurs in the RPR node 170 itself the RPR node 170 cannot transmit/receive an RPR frame to/from other RPR node. In such a case, the terminal 300 excludes the RPR node 170 from objects to be selected.

Like an RPR node, the terminal 300 may detect occurrence of trouble in a link with each of the RPR nodes. To be specific, the terminal 300 has a device similar to the port state monitoring unit 620 to monitor the states of ports, thereby detecting trouble in the link.

Each of the RPR nodes 100, 110, and 170 transmits a keep-alive frame every predetermined period to the terminal 300. When the keep-alive frame does not arrive for more than the predetermined period, the terminal 300 may determine that trouble occurs in the RPR node.

When any of the RPR nodes 100, 110, and 170 becomes unable to perform communication with other RPR node belonging to the RPR network 10, it is sufficient to transmit information indicative of the state to the terminal 300. For example, when trouble occurs in both of the link between the RPR nodes 170 and 160 and the link between the RPR nodes 170 and 100, the RPR node 170 transmits the information of the occurrence of the failure to the terminal 300.

The function of the terminal 300 can be realized easily by applying the ring aggregation (LAG) to the ports P1 to P3 of the terminal 300. In the example shown in FIG. 18, the ports P1, P2, and P3 of the terminal 300 are connected to links to the RPR nodes 100, 110, and 170, respectively.

When a plurality of selectable RPR nodes exist, the terminal 300 may select any of the RPR nodes 10, 110, and 170 by round robin or weighted round robin. Alternatively, any of the RPR nodes 10, 110, and 170 may be selected according to a parameter value included in an Ethernet frame to be transmitted from the terminal 300.

Although FIG. 18 shows the case where the common terminal 300 is accommodated under a plurality of RPR nodes in the RPR network 10. In place of the configuration, a common terminal may be accommodated under a plurality of EoE edge nodes belonging to an EoE network.

As described above, by applying the present invention, not only redundancy in an interlink connecting RPR networks but also redundancy in a link between an RPR network and a terminal can be realized.

The foregoing embodiments have been described that the RPR nodes and the EoE nodes have the processing units such as the frame analyzers 510-1 and 510-2. Any of the RPR nodes and the EoE nodes may have a computer, and the computer may perform operations similar to those of the processing units shown in FIGS. 3 and 16 in accordance with a program. It is sufficient to pre-store the program in a storage of the node.

The database described in the scope of claims is realized by the FDB 540. Searching means, address determining means, frame generating means, and generating means are realized by the RPR frame generator 520 (or the frame generator 640). Frame communication means for communication in system, signal transmitting means, transmission determining means, inhibiting means, means for determining whether transmission is possible or not at the time of broadcast reception, and transmitting means are realized by the RPR switch processing unit 530 (or the switch processing unit 650). Link state monitoring means is realized by the port state monitoring unit 620. Link failure notifying means 530 is realized by the RPR switch processing unit 530. Terminal frame transmitting means, and broadcast-reception terminal frame transmitting means are realized by the Ethernet frame extracting unit 570.

The invention claimed is:

1. A communication system comprising a plurality of networks to each of which first nodes and at least one second node are connected, wherein
the first nodes are assigned to a common virtual address indicating that the first nodes belong to a group, the common virtual address not being assigned to the at least one second node, the second node is connected to a terminal transmitting and receiving a terminal frame and does not belong to the group, each first node in each of the networks is set as a link to a respective first node of an other network, and
the second node of each of the networks has:
a database managing device recording at least a relationship between the common virtual address of the first nodes and an address of the terminal in a database;
a frame generator generating a network frame in which a terminal frame received from the terminal is contained; and
a switch processing device transmitting the network frame to its own network,
wherein the frame generator retrieves an address corresponding to a destination of the terminal frame received from the terminal from the database and determines, when the retrieved address is the common virtual address, a physical address of any one of the first nodes in its own network as a destination of the network frame,
wherein the frame generator recognizes a first node whose link to the other network is normal, and determines the physical address of the recognized first node as the destination of the network frame, and
wherein the first node has a monitoring device monitoring state of the link to the other network, and an address managing device notifying the other nodes of information on an instruction to exclude said first node from candidates of the destination of the network frame when trouble occurs in the monitored link.

2. The communication system according to claim 1, wherein the frame generator determines an address as the destination of the network frame in accordance with information included in the terminal frame received from the terminal.

3. The communication system according to claim 1, wherein the first node has a frame generator generating a network frame in which a common virtual address assigned to said first node itself as a transmitter and a terminal frame received from a link to the other network are contained, and the switch processing device of said first node transmits the network frame generated by the frame generator to its own network.

4. The communication system according to claim 1, wherein any of the plurality of networks is an RPR (Resilient Packet Ring) network or an EoE (Ethernet over Ethernet) network.

5. The communication system according to claim 1, wherein each of the plurality of networks is an RPR network or an EoE network.

6. The communication system according to claim 1, wherein the first node is connected to a first node of the other network in a one-to-one correspondence.

7. The communication system according to claim 1, further comprising a terminal linked to each of the first nodes belonging to a group, wherein the terminal transmits/receives a terminal frame to/from any of the first nodes of the group.

8. The communication system according to claim 7, wherein the terminal determines a first node to which a terminal frame is transmitted according to information included in the terminal frame.

9. The communication system according to claim 7, wherein the terminal recognizes a first node whose state of communication to a neighboring node is normal, and determines the node as a first node to which a terminal frame is to be transmitted.

10. The communication system according to claim 9, wherein the first node notifies a terminal linked to said first node itself of information on a state of communication between said first node itself and a neighboring node.

11. A communication system comprising a plurality of networks to each of which first nodes and at least one second node are connected, wherein
the first nodes are assigned to a common virtual address indicating that the first nodes belong to a group, the common virtual address not being assigned to the at least one second node, the second node is connected to a terminal transmitting and receiving a terminal frame and does not belong to the group, each first node in each of the networks is set as a link to a respective first node of an other network, and
the second node of each of the networks has:
a database managing device recording at least a relationship between the common virtual address of the first nodes and an address of the terminal in a database;
a frame generator generating a network frame in which a terminal frame received from the terminal is contained; and
a switch processing device transmitting the network frame to its own network,
wherein the frame generator retrieves an address corresponding to a destination of the terminal frame received from the terminal from the database and determines, when the retrieved address is the common virtual address, a physical address of any one of the first nodes in its own network as a destination of the network frame,
wherein the frame generator recognizes a first node whose state of communication with a neighboring node is normal, and determines the physical address of the recognized first node as the destination of the network frame, and
wherein the first node has a monitoring device monitoring state of communication with the neighboring node, and an address managing device notifying the other nodes of information on an instruction to exclude said first node from candidates of the destination of the network frame when trouble occurs in the monitored communication with the neighboring node.

12. A communication system comprising a plurality of networks to each of which first nodes and at least one second node are connected, wherein
the first nodes are assigned to a common virtual address indicating that the first nodes belong to a group, the common virtual address not being assigned to the at least one second node, the second node is connected to a terminal transmitting and receiving a terminal frame and does not belong to the group,
the second node of each of the networks has:
a database managing device recording at least a relationship between the common virtual address of the first nodes and an address of the terminal in a database;
a frame generator generating a network frame in which a terminal frame received from the terminal is contained; and
a switch processing device transmitting the network frame to its own network,
wherein the frame generator retrieves an address corresponding to a destination of the terminal frame received from the terminal from the database and sets, when the retrieved address is the common virtual address, destination of multicast communication to all of the first nodes to which the common virtual address are assigned as the destination of the network frame,
each first node in each of the networks is set as a link to a respective first node of the other network, and has a switch processing device determining, when receiving a network frame in which destination of multicast communication is set, whether to transmit or not a terminal frame contained in the received network frame to the link to the other network according to information included in a received network frame or information included in a terminal frame in the network frame and a frame extracting device extracting the terminal frame to be transmitted to the link to the other network from the network frame and transmitting the extracted terminal frame, and
the first node transmitting the terminal frame to the link is any one of the first nodes whose links to an other network are normal,
wherein the switch processing device determines, when receiving a network frame in which a common virtual address of its own group is set as a transmitter address and an address of broadcast communication is set as a destination address, not to transmit a terminal frame contained in the network frame to the link to the other network.

13. The communication system according to claim 12, wherein
the switch processing device of the first node determines, when receiving a network frame in which an address of broadcast communication is set as a destination address and a physical address of a second node is set as a transmitter address, whether to transmit or not the network frame to a link to the other network, and
the switch processing device in any one of the first nodes belonging to the group determines to transmit the terminal frame.

14. The communication system according to claim 13, wherein the switch processing device in the first node determines, according to information included in a network frame in which an address of broadcast communication is set as a destination address and a physical address of a second node is set as a transmitter address or information included in a terminal frame in the network frame, whether to transmit or not the terminal frame to the link.

15. The communication system according to claim 13, wherein the first node transmitting the terminal frame to the link is any one of first nodes whose links to the other network are normal and belonging to the group.

16. The communication system according to claim 12, wherein the first node has a frame generator generating a network frame in which a common virtual address assigned to said first node itself as a transmitter and a terminal frame received from a link to the other network are contained, and
the switch processing device of said first node transmits the network frame generated by the frame generator to its own network.

17. The communication system according to claim 12, wherein any of the plurality of networks is an RPR (Resilient Packet Ring) network or an EoE (Ethernet over Ethernet) network.

18. The communication system according to claim 12, wherein each of the plurality of networks is an RPR network or an EoE network.

19. The communication system according to claim 12, wherein the first node is connected to a first node of the other network in a one-to-one correspondence.

20. The communication system according to claim 12, further comprising a terminal linked to each of the first nodes belonging to a group, wherein the terminal transmits/receives a terminal frame to/from any of the first nodes of the group.

21. The communication system according to claim 20, wherein the terminal determines a first node to which a terminal frame is transmitted according to information included in the terminal frame.

22. The communication system according to claim 20, wherein the terminal recognizes a first node whose state of communication to a neighboring node is normal, and determines the node as a first node to which a terminal frame is to be transmitted.

23. The communication system according to claim 22, wherein the first node notifies a terminal linked to said first node itself of information on a state of communication between said first node itself and a neighboring node.

24. A communication method of a system comprising a plurality of networks to each of which first nodes and at least one second node are connected, wherein the first nodes are assigned to a common virtual address indicating that the first nodes belong to a group, the common virtual address not being assigned to the at least one second node, and the second node is connected to a terminal transmitting and receiving a terminal frame and does not belong to the group, the method comprising
the steps carried out by the second node of each of the networks of:
recording at least a relationship between the common virtual address of the first nodes and an address of the terminal in a database;
generating a network frame in which a terminal frame received from the terminal is contained;
retrieving an address corresponding to a destination of the terminal frame received from the terminal from the database;
setting, when the retrieved address is the common virtual address, destination of multicast communication to all of the first nodes to which the common virtual address are assigned as the destination of the network frame; and transmitting the network frame to the network of said second node, and the steps carried out by each first node of each of the networks of:

setting itself as a link to a respective first node of the other network;

determining, when receiving a network frame in which destination of multicast communication is set, whether to transmit or not a terminal frame contained in the received network frame to the link to the other network according to information included in a received network frame or information included in a terminal frame in the network frame; and extracting the terminal frame to be transmitted to the link to the other network from the network frame and transmitting the extracted terminal frame, wherein the first node transmitting the terminal frame to the link is any one of the first nodes whose links to the other network are normal, the method further comprising: determining, when receiving a network frame in which a common virtual address of its own group is set as a transmitter address and an address of broadcast communication is set as a destination address, not to transmit a terminal frame contained in the network frame to the link to an other network.

\* \* \* \* \*